United States Patent
Diguet et al.

(10) Patent No.: US 11,294,251 B2
(45) Date of Patent: Apr. 5, 2022

(54) ELECTRICALLY CONTROLLABLE DEVICE HAVING AN ELECTROACTIVE LAYER CONTAINING LIQUID CRYSTALS AND A POLYMERIC BARRIER BETWEEN THE ELECTROACTIVE LAYER AND AN ELECTRODE

(71) Applicant: SAINT-GOBAIN GLASS FRANCE, Courbevoie (FR)

(72) Inventors: Antoine Diguet, Paris (FR); Benoit Louis, Saint Denis (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/635,113

(22) PCT Filed: Jul. 25, 2018

(86) PCT No.: PCT/FR2018/051905
§ 371 (c)(1),
(2) Date: Jan. 29, 2020

(87) PCT Pub. No.: WO2019/025702
PCT Pub. Date: Feb. 7, 2019

(65) Prior Publication Data
US 2020/0379283 A1 Dec. 3, 2020

(30) Foreign Application Priority Data

Jul. 31, 2017 (FR) .................................. 1757295

(51) Int. Cl.
*G02F 1/137* (2006.01)
*B60J 1/00* (2006.01)
(Continued)

(52) U.S. Cl.
CPC .............. *G02F 1/137* (2013.01); *B60J 1/001* (2013.01); *B60R 16/02* (2013.01); *E06B 3/6722* (2013.01);
(Continued)

(58) Field of Classification Search
CPC combination set(s) only.
See application file for complete search history.

(56) References Cited

U.S. PATENT DOCUMENTS

| 4,472,028 A | 9/1984 | Ooue et al. |
| 4,891,152 A | 1/1990 | Miller et al. |

(Continued)

FOREIGN PATENT DOCUMENTS

| CN | 1975521 A | 6/2007 |
| EP | 0 821 260 A1 | 1/1998 |

(Continued)

OTHER PUBLICATIONS

International Search Report as issued in International Patent Application No. PCT/FR2018/051905, dated Sep. 24, 2018.
(Continued)

*Primary Examiner* — Lauren Nguyen
(74) *Attorney, Agent, or Firm* — Pillsbury Winthrop Shaw Pittman LLP

(57) ABSTRACT

A device having a scattering which can be varied by liquid crystals includes a first electrode, an electroactive layer and a second electrode. It includes, between the first electrode and the electroactive layer, a first transparent polymeric barrier layer with a thickness of $T_1$ and optionally, between the second electrode and the electroactive layer, a second transparent polymeric barrier layer with a thickness of $T_2$, $T_1$ being nonzero and at least 1 μm, and $T_1+T_2$ being at most 40 μm. The first polymeric barrier layer carries the first electrode or the first electrode is on a first dielectric substrate.

(Continued)

Figure 1:
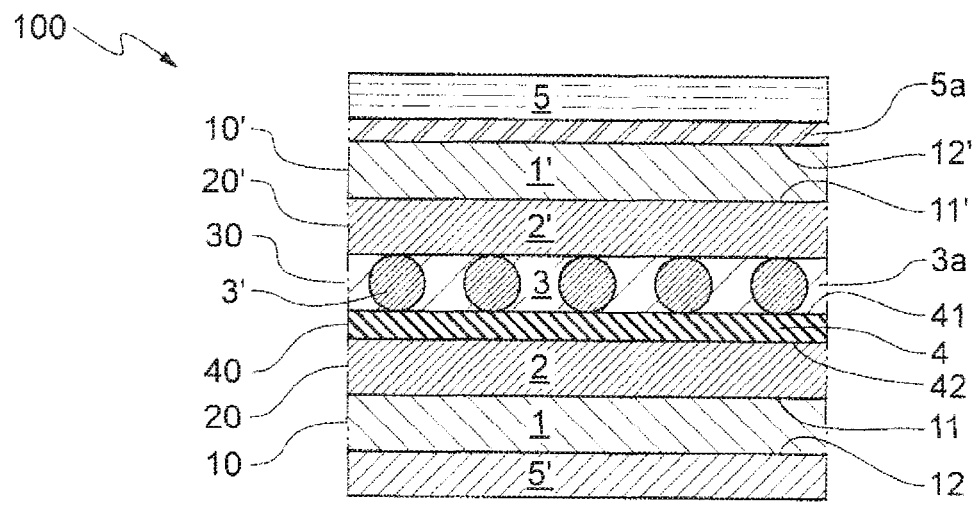

The second optional polymeric barrier layer carries the second electrode or the second electrode is on a second dielectric substrate.

20 Claims, 6 Drawing Sheets

(51) Int. Cl.
| | | |
|---|---|---|
| *B60R 16/02* | (2006.01) | |
| *E06B 3/67* | (2006.01) | |
| *G02F 1/1334* | (2006.01) | |
| *G02F 1/1339* | (2006.01) | |
| *G02F 1/1343* | (2006.01) | |

(52) U.S. Cl.
CPC ........ *G02F 1/1334* (2013.01); *G02F 1/13394* (2013.01); *G02F 1/134309* (2013.01)

(56) References Cited

U.S. PATENT DOCUMENTS

| | | | | |
|---|---|---|---|---|
| 6,219,125 | B1* | 4/2001 | Ishikura | G02F 1/13439 |
| | | | | 349/147 |
| 6,287,649 | B1* | 9/2001 | Fukushima | B82Y 30/00 |
| | | | | 428/1.2 |
| 6,452,650 | B1* | 9/2002 | Nakao | G02F 1/1334 |
| | | | | 349/86 |
| 2001/0017677 | A1* | 8/2001 | Kishimoto | G02B 5/201 |
| | | | | 349/106 |
| 2001/0018099 | A1* | 8/2001 | Gibbons | C08G 73/10 |
| | | | | 428/1.27 |
| 2003/0090012 | A1* | 5/2003 | Allen | G02F 1/133536 |
| | | | | 264/1.31 |
| 2009/0027612 | A1* | 1/2009 | Tomita | G02B 5/3016 |
| | | | | 349/182 |
| 2010/0071810 | A1* | 3/2010 | Nadaud | C03C 17/36 |
| | | | | 148/400 |
| 2012/0088101 | A1* | 4/2012 | Friedman | B32B 27/40 |
| | | | | 428/339 |

FOREIGN PATENT DOCUMENTS

| | | |
|---|---|---|
| EP | 0 844 075 A1 | 5/1998 |
| EP | 1 653 275 A1 | 5/2006 |
| WO | WO 2004/025334 A2 | 3/2004 |
| WO | WO 2010/136702 A1 | 12/2010 |
| WO | WO 2011/161391 A1 | 12/2011 |
| WO | WO 2012/028823 A1 | 3/2012 |
| WO | WO 2014/072596 A1 | 5/2014 |
| WO | WO 2017/119120 A1 | 7/2017 |

OTHER PUBLICATIONS

International Preliminary Report on Patentability and the Written Opinion of the International Searching Authority as issued in International Patent Application No. PCT/FR2018/051905, dated Feb. 4, 2020.

First Office Action as issued in Chinese Patent Application No. 201880002185.6, dated Mar. 3, 2021.

* cited by examiner

ELECTRICALLY CONTROLLABLE DEVICE HAVING AN ELECTROACTIVE LAYER CONTAINING LIQUID CRYSTALS AND A POLYMERIC BARRIER BETWEEN THE ELECTROACTIVE LAYER AND AN ELECTRODE

CROSS-REFERENCE TO RELATED APPLICATIONS

This application is the U.S. National Stage of PCT/FR2018/051905, filed Jul. 25, 2018, which in turn claims priority to French patent application number 1757295 filed Jul. 31, 2017. The content of these applications are incorporated herein by reference in their entireties.

The invention relates to an electrically controlled device having a scattering which can be varied by liquid crystals, possessing, between two electrodes, a layer of liquid crystals alternating reversibly between a transparent state and a scattering state, by application of an alternating electric field.

Glazings are known for which certain characteristics can be modified under the effect of an appropriate electrical supply, very particularly the transmission, the absorption, the reflection in certain wavelengths of electromagnetic radiation, in particular in the visible region and/or in the infrared region, or else light scattering.

The electrically controllable glazing having liquid crystals can be used everywhere, both in the construction sector and in the automobile sector, each time that the view through the glazing has to be prevented at given moments.

The electrodes commonly used are made of mixed indium tin oxide (ITO). In order to protect from short-circuits generated by conducting impurities having a size greater than or equal to the distance between the electrodes, each of the ITO layers can be coated with one or more dielectric layers of oxides or nitrides, such as $Si_3N_4$ or $SiO_2$, as mentioned in the document WO2014/072596, with a cumulative thickness of 50 to 150 nm.

An object of the invention consists in developing an electrically controllable liquid crystal device which is even more reliable, without damaging its optical and electrical properties.

To this end, the present invention first provides an electrically controllable device having a scattering which can be varied by liquid crystals comprising a stack of layers in this order:
  a first, preferably transparent, electrode comprising (indeed even consisting of) a first electrically conductive layer (monolayer or multilayer) which is in particular mineral and especially of at most 200 nm,
  an electroactive layer containing (indeed even consisting of) liquid crystals and spacers (transparent, in particular plastic or glass) preferably in a polymer (organic) material (matrix), in particular alternating reversibly between a scattering state (off state) and a transparent state (on state) by application of an alternating electric field, the active layer having a micronic thickness $T_0$ in particular of 3 to 45 µm and even of 5 to 40 µm, indeed even of 5 or 8 µm to 30 µm,
  a second, preferably transparent, electrode comprising (indeed even consisting of) a second electrically conductive layer (monolayer or multilayer) which is in particular mineral and especially of at most 200 nm,
in the transparent state, the electroactive layer being visible by transparency on the side of the first electrode and/or on the side of the second electrode.

The stack comprises, between the first electrode and the electroactive layer, a first transparent polymeric (organic) barrier layer with a thickness of $T_1$ and optionally, between the second electrode and the electroactive layer, a second transparent polymeric (organic) barrier layer with a thickness of $T_2$, $T_1$ being nonzero and at least 1 µm, and $T_1+T_2$ being at most 40 µm and even at most 30 µm.

The first polymeric barrier layer carries the first electrode on a first main exterior face oriented on the side opposite the electroactive layer or the first electrode is on a first main "internal" face of a first, preferably transparent (in particular if the first electrode is transparent), dielectric substrate oriented toward the electroactive layer.

And the second optional polymeric barrier layer carries the second electrode on a second main exterior face oriented on the side opposite the electroactive layer or the second electrode is on a second main "internal" face of a second, preferably transparent (in particular if the second electrode is transparent), dielectric substrate oriented toward the electroactive layer (if appropriate, at least the first or the second substrate which, from the side where the electroactive layer is visible in the transparent state, being transparent).

Surprisingly, the or both polymeric barrier layers according to the invention are sufficiently thick to protect from short-circuits without raising the commutating voltage too greatly, in particular as the thickness $T_1+T_2$ has been limited.

The polymeric barrier layer according to the invention does not reduce the transmission of the light or generate optical defects or other heterogeneities for example encountered on mineral layers obtained by magnetron sputtering depositions. The polymeric barrier layer can thus more efficiently reduce short-circuits than the mineral layers of the prior art.

A polymeric (organic) layer is in addition of low cost and easily thicker (and of good quality) than a mineral layer.

The first polymeric barrier layer (and even respectively the second optional polymeric barrier layer) according to the invention, with or without coating or surface treatment, is preferably in contact with the electroactive layer and even with the first electrode (respectively with the second electrode).

The first polymeric barrier layer (and even the second optional polymeric barrier layer) according to the invention can be a film or a deposit. The first polymeric barrier layer (and even the second optional polymeric barrier layer) according to the invention can be a monolayer or a multilayer (for example by coextrusion of—organic-polymers), with or without surface chemical treatment.

The surface of the first polymeric barrier layer on the side of the first electrode can be smooth or at least not very rough. It is preferable to limit the roughnesses (for example, RMS roughness of at most 20 nm), in particular if this layer is a film carrying the first electrode (by deposition on the film, for example by physical or chemical vapor deposition PVD or CVD).

The surface of the first polymeric barrier layer on the side of the electroactive layer can be smooth or at least not very rough. It is preferable to limit the roughnesses (for example, RMS roughness of at most 20 nm) in order to prevent heterogeneities (more scattering and/or less transparent region, and the like).

In a first embodiment preferred both for the simplicity of assembling and in order to have a graded thickness, the first polymeric barrier layer is a first transparent film based on polymeric material chosen from a polyester, in particular a polyethylene terephthalate (PET), a polyethylene naphthalate (PEN), a polycarbonate (PC), a polyolefin, such as a polyethylene (PE) or a polypropylene (PP), a polyurethane, a polyamide, a polyimide or else a fluoropolymer, such as ethylene-tetrafluoroethylene (ETFE), ethylene-chlorotrifluoroethylene (ECTFE), polyvinylidene fluoride (PVDF), polychlorotrifluoroethylene (PCTFE) and fluorinated ethylene-propylene copolymers (FEPs). And preferably the second optional polymeric barrier layer is a second transparent film made of polymeric material chosen from a polyester, in particular a polyethylene terephthalate (PET), a polyethylene naphthalate (PEN), a polycarbonate, a polyolefin, such as a polyethylene (PE) or a polypropylene (PP), a polyurethane, a polyamide, a polyimide or a fluoropolymer, such as ethylene-tetrafluoroethylene (ETFE), ethylene-chlorotrifluoroethylene (ECTFE), polyvinylidene fluoride (PVDF), polychlorotrifluoroethylene (PCTFE) and fluorinated ethylene-propylene copolymers (FEPs). It is preferable to choose two films of the same material or at least polymeric matrix. The tint, on the other hand, can vary.

PET is preferred due to its transparency, its surface quality, its mechanical strength and its availability, at all sizes.

The absorption of this transparent film according to the invention, in particular of PET, is preferably of less than 0.5% or even of at most 0.2% and with a haze of less than 1.5% and even of at most 1%.

The barrier film according to the invention can be set back from the edge of the first substrate, of the same size or can extend beyond the edge of the first substrate over one, two, three or four sides.

The barrier film according to the invention can facilitate the electrical connection of the first electrode.

A barrier film according to the invention of less than 15 µm is preferred but it is possible to choose a film according to the invention of 25 µm in order to simplify the flatness.

In particular, in a configuration a) of this first form, the first polymeric barrier layer can be a transparent film with a nonzero thickness $T_1$ of at most 25 µm and preferably of at least 2 µm or even of at least 5 µm and the second polymeric barrier layer is absent (of zero thickness $T_2$)—thus the second electrode is in contact with the electroactive layer. In particular, the first electrode (monolayer or multilayer, in particular (dielectric layer)/electrically conducting layer/(dielectric layer)) can be in contact with the first film. It is possible to choose a readily available thickness, such as 12 µm for PET.

In particular, in a configuration b) of this first form, the first polymeric barrier layer is a transparent film of nonzero thickness $T_1$ of at most 25 µm and even of at most 15 µm or 10 µm, preferably of at least 2 µm or even of at least 5 µm, and the second polymeric barrier layer is a transparent film of nonzero thickness $T_2$ of at most 15 µm or 10 µm and preferably of at least 2 µm or even of at least 5 µm, and even $T_1$ and $T_2$ (non zero) are of at most 20 µm.

In a second embodiment of the barrier layer, a deposit (obtained by the liquid route) is chosen instead of a film, preferably with a thickness of less than 10 µm. Also, the first dielectric substrate is transparent and carries the first electrode and the first polymeric barrier layer which (is a deposit and) is chosen from the following polymers: polyacrylate, polyester, polyurethane, polyamide, polyethylene, polyalcohol, polyvinylpyrrolidone, polycarbonate, polystyrene, cellulose polymer or synthetic latex.

And optionally the second dielectric substrate is transparent and carries the second electrode and the second optional polymeric barrier layer, preferably with a thickness of less than 10 µm, which (is a deposit) is chosen from the following polymers: polyacrylate, polyester, polyurethane, polyamide, polyethylene, polyalcohol, polyvinylpyrrolidone, polycarbonate, polystyrene, cellulose polymer or synthetic latex.

Use may be made of any known means for deposition by the liquid route.

In one implementation (with a first polymeric barrier layer which is a film or deposit), the first dielectric substrate is transparent and carries the first electrode which is transparent and is chosen from a first glass sheet or a first transparent polymeric sheet with on the side of the first external face opposite the first internal face an optional first hard coat, especially if it is a free surface (in particular without protective glazing or plastic film, which is non-laminated and not assembled in a double or triple glazing).

And optionally (with a second polymeric layer which is a film or deposit) the second dielectric substrate is transparent and carries the second electrode and is chosen from a second glass sheet or a second transparent polymeric sheet with on the side of the second external face opposite the second internal face an optional second hard coat, especially if it is a free surface (in particular without protective glazing or plastic film, which is non-laminated and not assembled in a double or triple glazing).

The (first and/or second) hard coat is, for example, an organic polymeric layer, for example based on acrylate (optionally with nano- or microparticles of inorganic oxides), or even a mineral layer (sol-gel, PVD or CND deposit), for example or metal or silicon nitrides and/or oxides.

With regard to the first dielectric substrate, the first electrode, which is preferably transparent, can be mineral; in particular, the mineral electrically conductive layer is based on one or more transparent conducting oxides or a metal layer of at most 20 nm, preferably within a stack of thin layers of metal and/or silicon oxides and/or nitrides.

In order to reinforce the contact between first electrode and first polymeric film, the device can comprise, between the first mineral electrode and the first transparent polymeric film, a polymeric transparent "adhesion" layer which is electrically conductive or which is dielectric and with a thickness $T_3$ of at most 10 µm and even of at most 5 or 2 µm (preferably such that $T_1+T_2+T_3$ is at most 40 µm or even at most 30 µm), especially an adhesive layer, in particular a pressure-sensitive adhesive layer.

For example, the adhesion layer is (a deposit) based on one or more conducting polymers of one at least of the following families:
  the family of the polythiophenes, such as PEDOT poly (3,4-ethylenedioxythiophene), PEDOT/PSS, that is to say poly(3,4-ethylenedioxythiophene) mixed with polystyrenesulfonate, and any other derivative as described in the application US2004253439,
  or else poly(acetylene)s, poly(pyrrole)s, poly(aniline)s, poly(fluorene)s, poly(3-alkylthiophene)s, polytetrathiafulvalenes, polynaphthalenes, poly(p-phenylene sulfide) and poly(para-phenylene vinylene)s.

For the polythiophenes, it is possible to choose, for example, the product sold by HC Strack under the Baytron® name or else by Agfa under the Orgacon® name, or under the name of Orgacon EL-P3040®.

The first dielectric adhesion layer (and/or the optional second) can be a sheet of pressure-sensitive adhesive.

The dielectric adhesion layer (non-adhesive) can, for example, be a gel, in particular a hydrogel, based on polyacrylamide, polyvinyl alcohol, polyurethane, polysaccharide, polyethylene glycol, polylactic acid or silicone.

The dielectric adhesion layer can even be a pressure-sensitive adhesive. A pressure-sensitive adhesive, abbreviated to PSA and commonly called self-adhesive, is an adhesive which forms a bond when a pressure is applied to it, so as to render the adhesive integral with the surface to be adhesively bonded. Neither solvent nor water nor heat is necessary to activate the adhesive. It is used in automobile trims and in a great variety of other products.

As its name indicates it "pressure-sensitive", the degree of bonding between a given surface and the self-adhesive binder is influenced by the amount of pressure used to apply the adhesive to the target surface. Other factors are also involved and are important for good adhesion, such as softness, surface energy and removal of contaminants.

PSAs are generally designed to form a bond and to maintain the latter at ambient temperature. A person skilled in the art will take care to choose a self-adhesive adhesive formulation suited to the conditions of its use. This is because PSAs generally experience a reduction in or disappearance of their adhesion at low temperature and experience a reduction in their ability to withstand shearing at elevated temperatures.

PSAs are generally based on an elastomer coupled with an appropriate additional adhesive agent or "tackifying" agent (for example an ester resin).

The elastomers can be based:
1/on acrylates, which may be sufficiently sticky not to require an additional tackifying agent,
2/on nitriles,
3/on silicone, requiring special tackifying agents, such as silicate resins of "MQ" type composed of monofunctional trimethylsilane ("M") which has reacted with quadrifunctional silicon tetrachloride ("Q"). PSAs based on silicone are, for example, polydimethylsiloxane gums and resins dispersed in xylene or a mixture of xylene and toluene,
4/on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers,
5/on vinyl ethers.

Advantageously, the pressure-sensitive adhesive is chosen from PSAs based on acrylates and PSAs based on silicone.

These adhesives are sold in the form of double-sided adhesive rolls.

Mention may be made, as PSAs based on silicone, of the Dow Corning® adhesives, such as 2013 Adhesive, 7657 Adhesive, 02-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

The first dielectric substrate (and/or the second) can be made of flexible or inflexible plastic material, for example with a thickness of at most 300 µm or 150 µm or of at least 1 mm. The substrate can in particular be based on polyester, especially a polyethylene terephthalate (PET) or polyethylene naphthalate (PEN), on polycarbonate, a polyolefin (polyethylene, polypropylene), on polyurethane, on polymethyl methacrylate (PMMA), on polyimide, on polyimide or a polyvinyl chloride (PVC), indeed even on fluoropolymer, such as ethylene-tetrafluoroethylene (ETFE), polyvinylidene fluoride (PVDF), polychlorotrifluorethylene (PCTFE) ethylene-chlorotrifluoroethylene (ECTFE) and fluorinated ethylene-propylene copolymers (FEPs).

PET or else PC or PMMA is preferred. The choice depends in particular on the flexibility desired.

The first dielectric substrate can be a first glass sheet which is, on the side of the first external face opposite the first internal face, laminated via a thermoplastic lamination interlayer with another glass sheet.

This polymer lamination interlayer can in particular be a layer based on polyvinyl butyral (PVB), on ethylene-vinyl acetate (EVA), on polyethylene (PE), on polyvinyl chloride (PVC), on thermoplastic urethane, on polyurethane PU or even on ionomer, on adhesive based on polyolefin, on thermoplastic silicone or made of multi- or one-component resin which can be crosslinked thermally (epoxy, PU) or with ultraviolet radiation (epoxy, acrylic resin).

The first, glass or plastic, carrier substrate (and/or the second, glass or plastic, carrier substrate) can be larger in size than the electroactive layer. In particular, the first carrier substrate can be coated with an electrically conductive layer covering all or part of its main face (for example at least 50% or 80%), one region of which forms the first electrode, in particular electrically insulated (by one or more insulating lines, laser etching, and the like) from another region of this layer. This electrically conductive layer can act as solar control layer, heating layer, and the like.

Use may be made, for example, of a clear PET film coated with an electrically conductive layer, for example clear PET film denoted XIR from Eastman, a coextruded film made of PET-PMMA, for example of the SRF 3M® type (SRF for Solar Reflecting Film), but also numerous other films (for example made of PC, PE, PEN, PMMA, PVC), and the like.

In an alternative implementation to the electrode-carrying substrate, which is more flexible, the first polymeric barrier layer is a first, preferably transparent, film carrying the first electrode, in particular with the abovementioned thicknesses and/or materials, especially a first PET. And optionally the second polymeric barrier layer possibly is a second, preferably transparent, film carrying the second electrode, in particular with the abovementioned thicknesses and/or materials, especially a second PET.

The first polymeric barrier layer can especially be a first, preferably transparent, film carrying the first electrode and even the device can additionally comprise a first additional transparent sheet, polymeric or made of glass, bonded to the first electrode by a first transparent dielectric adhesive layer (optically clear adhesive or OCA) or a thermoplastic lamination interlayer. And optionally the second polymeric barrier layer can especially be a second film carrying or not carrying the second electrode and even the device additionally comprises a second additional transparent sheet, polymeric or made of glass, bonded to the first electrode by a second transparent dielectric adhesive layer (optically clear adhesive) preferably like the first adhesive layer.

The optically clear adhesive is in particular (a resin) based on polyester, acrylic or silicone. It can be a pressure-sensitive adhesive (PSA)

The first transparent dielectric adhesive layer (and/or the optional second) can be a sheet of pressure-sensitive adhesive.

A pressure-sensitive adhesive, abbreviated to PSA and commonly called self-adhesive, is an adhesive which forms a bond when a pressure is applied to it, so as to render the adhesive integral with the surface to be adhesively bonded. Neither solvent nor water nor heat is necessary to activate the adhesive. It is used in automobile trims and in a great variety of other products.

As its name indicates it "pressure-sensitive", the degree of bonding between a given surface and the self-adhesive binder is influenced by the amount of pressure used to apply the adhesive to the target surface. Other factors are also involved and are important for good adhesion, such as softness, surface energy and removal of contaminants.

PSAs are generally designed to form a bond and to maintain the latter at ambient temperature. A person skilled in the art will take care to choose a self-adhesive adhesive formulation suited to the conditions of its use. This is because PSAs generally experience a reduction in or disappearance of their adhesion at low temperature and experience a reduction in their ability to withstand shearing at elevated temperatures.

PSAs are generally based on an elastomer coupled with an appropriate additional adhesive agent or "tackifying" agent (for example an ester resin).

The elastomers can be based:
1/on acrylates, which may be sufficiently sticky not to require an additional tackifying agent,
2/on nitriles,
3/on silicone, requiring special tackifying agents, such as silicate resins of "MQ" type composed of monofunctional trimethylsilane ("M") which has reacted with quadrifunctional silicon tetrachloride ("Q"). PSAs based on silicone are, for example, polydimethylsiloxane gums and resins dispersed in xylene or a mixture of xylene and toluene,
4 on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers,
5/on vinyl ethers.

Advantageously, the pressure-sensitive adhesive is chosen from PSAs based on acrylates and PSAs based on silicone.

These adhesives are sold in the form of double-sided adhesive rolls.

Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

The additional sheet can have a greater surface area than the stack.

One of the free external faces of the stack (substrate or barrier film) can comprise a temporary protective plastic film (liner), that is to say which covers a covering adhesive layer (acrylic, and the like)—as full face—or forming a peripheral frame. This adhesive layer can be used to fix the stack to any type of flat or curved support which is transparent, such as a glazing or a plastic film, or opaque (wall), if the device is a commutable mirror (the electrode destined to be on the support side is then reflecting).

The first polymeric barrier layer can be tinted: in particular, neutral tints, such as blue, green, gray or bronze, are chosen.

The first and/or second substrate can have greater surface areas than the electroactive layer.

In preferred implementations, the stack can comprise the following (strict or nonstrict) sequence (the elements in brackets being optional):

(hard coat or liner/) first PET substrate/first electrode (such as ITO and the like)/first barrier film (such as PET)/electroactive layer/(second barrier film (such as PET)/) second electrode (such as ITO and the like)/second PET substrate (/hard coat)

first glass substrate/first electrode (such as ITO and the like)/first barrier film (such as PET)/electroactive layer/(second barrier film, such as PET)/second electrode (such as ITO and the like)/second glass substrate glass/PVB or EVA, indeed even PU/first PET substrate/first electrode (such as ITO and the like)/first barrier film, such as PET/electroactive layer/(second barrier film, such as PET)/second electrode (such as ITO and the like)/second PET substrate(/PVB or EVA, indeed even PU/glass)

first electrode (such as ITO and the like)/first barrier film, such as PET, which carries the first electrode/electroactive layer/(second barrier film, such as PET)/second electrode (ITO and the like)/second PET substrate(/hard coat)

PET or glass/optically clear adhesive/first electrode (such as ITO and the like)/first barrier film, such as PET, which carries the first electrode/electroactive layer/(second barrier film, such as PET)/second electrode (such as ITO and the like)/second PET substrate first electrode (such as ITO and the like)/first barrier film, such as PET, which carries the first electrode/electroactive layer/(second barrier film, such as PET)/second electrode (such as ITO and the like)/second PET substrate first electrode (such as ITO and the like)/first barrier film, such as PET, which carries the first electrode/electroactive layer/second barrier film, such as PET, which carries the second electrode (such as ITO and the like).

Each barrier film is preferably flexible, flat or curved, and capable of adjusting to the curvature or curvatures of a glazing or other support, for example. Each substrate can be flexible, flat or curved, and capable of adjusting to the curvature or curvatures of an additional glazing or other support, for example.

The main faces of each barrier layer (and/or of each substrate) can be rectangular, square or even of any other shape (round, oval, polygonal and the like). Each barrier layer and/or substrate can be large in size, for example with a surface area of greater than 0.02 m$^2$, indeed even 0.5 m$^2$ or 1 m$^2$.

The or each barrier layer—deposit or film—(and/or each substrate) can be transparent and preferably exhibit a light transmission $T_L$ of greater than or equal to 70%, preferably of greater than or equal to 80%, indeed even of greater than or equal to 90%.

The or each barrier layer—deposit or film—can be tinted, for example in blue, green, gray or bronze. The light transmission $T_L$ can then be at most 55%, in particular from 20% to 50%.

The or each substrate, in particular made of glass, can, however, be tinted, for example in blue, green, gray or bronze.

The first electrode and/or the second electrode can be a transparent conductive oxide layer, known as TCO layer.

The TCO preferably has a thickness suitable for having a ("intrinsic") sheet resistance of less than or equal to 150Ω/□, preferably of less than or equal to 120 Ω/□.

The TCO layer is, for example, supplied electrically via current supply means which are preferably metallic (based on silver, on copper, and the like), preferably in the form of a (metal) strip/along an edge.

The barrier film or the first substrate carrying the TCO layer can protrude beyond the electroactive layer in order to promote the electrical connection, for example made as in the application WO2011/161391 (FIG. 1 or other figures) or EP 1 653 275.

The layer of a transparent electrically conductive oxide is preferably a layer of indium tin oxide (ITO). Other layers are possible, including thin layers:
- based on indium zinc oxide (called "IZO"), on indium gallium zinc oxide (IGZO),
- based on doped zinc oxide, preferably doped with gallium or with aluminum (AZO, GZO), based on niobium-doped titanium oxide, based on cadmium stannate or zinc stannate,
- based on fluorine-doped tin oxide ($SnO_2$:F), based on antimony-doped tin oxide.

In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%.

For layers based on fluorine-doped tin oxide, the atomic percentage of fluorine is preferably at most 5% and generally from 1 to 2%.

ITO is particularly preferred or even IZO, AZO, GZO or IGZO. Easily deposited by a cathode sputtering process, in particular a magnetron cathode sputtering process, these layers are characterized by a lower roughness than by CVD.

One of the advantages of fluorine-doped tin oxide is, on the other hand, its ease of deposition by chemical vapor deposition (CVD), and can be implemented on the float flat glass production line. In one embodiment, the layers of the stack are obtained by chemical vapor deposition directly on the line for production of the glass sheet by the float glass method. The deposition is carried out by spraying precursors through nozzles, over the ribbon of hot glass. The deposition of the different layers can be carried out at different points of the line: in the float chamber, between the float chamber and the lehr, or in the lehr. The precursors are generally organometallic molecules or molecules of the halides type.

Mention may be made, by way of examples, for fluorine-doped tin oxide, of tin tetrachloride, monobutyltin trichloride (MBTC), trifluoroacetic acid or hydrofluoric acid. Silicon oxide can be obtained using silane, tetraethoxysilane (TEOS) or else hexamethyldisiloxane (HDMSO), optionally using an accelerator, such as triethyl phosphate.

It is also possible to position, between the substrate and the TCO layer, a stack of neutralization layers. Such layers (at least two layers) make it possible to influence the appearance in reflection of the glazing, in particular its color in reflection. Once the electrically conductive support is coated with the layer of liquid crystals (and even once another identical electrically conductive support has been added), colors are obtained which are preferably neutral, slightly bluish or green, characterized by colorimetric coordinates a*, b*close to 0, a*, b*negative or a*negative and b*slightly positive, which are preferred to purple, pink, red colors (a*more positive).

In a preferred embodiment, the stack comprises, in this order, on the main face, under the TCO layer:
- a first underlayer based on silicon nitride ($SiN_x$, preferably $Si_3N_4$) which is optionally doped, preferably with aluminum, with a thickness $t_y$ of 5 to 50 nm, or better still of 10 nm to 35 nm, preferably (directly) in contact with the main face and preferably essentially composed of a silicon nitride which is optionally doped, preferably with aluminum;
- a second underlayer based on silicon oxide ($SiO_x$, preferably $SiO_2$), with a thickness $t_z$ of 10 to 50 nm, or better still of 20 nm to 50 nm, preferably essentially consisting of silicon oxide, underlayer undoped or optionally doped, preferably with aluminum, preferably in contact with the TCO layer.

A few examples of stacks of thin layers forming the first electrode are given below:
$SiN_x/SiO_x/TCO$ (preferably ITO)/$SiN_x/(SnZnO)/SiO_x$
$SiN_x/SiO_x/TCO$ (preferably ITO)/$SiN_x/SnZnO/SiO_x$
$SiN_x/(SnZnO)/SiO_x/TCO$ (preferably ITO)/$SiN_x/(SnZnO)/SiO_x$.

The different layers can be deposited on the substrate by any type of process for the deposition of thin layers. It may, for example, concern processes, (liquid or solid) pyrolysis, chemical vapor deposition (CVD), in particular plasma-enhanced chemical vapor deposition (PECVD), optionally under atmospheric pressure (APPECVD), evaporation, indeed even of sol-gel type.

The device according to the invention can comprise a laminated glazing comprising:
- a first additional glass sheet, in particular with a thickness of 0.7 mm to 4 mm,
- a thermoplastic lamination interlayer,
- a second additional glass sheet, in particular with a thickness of 0.7 mm to 4 mm or even of less than 0.7 mm, or else a sheet of plastic, such as a polycarbonate or a PMMA (in particular with a lamination interlayer made of PU), the main internal faces, known as F2 and F3, of the first and second additional glass sheets facing one another, the stack being between the faces F2 and F3 and preferably in the lamination interlayer.

Preferably, the thermoplastic lamination interlayer surrounds the edge of the stack.

The edge face of the stack can be set back with respect to the outermost edge face of the lamination interlayer (or of the first sheet).

Preferably, the optional first and/or second substrates preferably have a thickness of at most 0.7 mm and even of at most 0.3 or 0.2 mm. It is possible to choose, for the glass substrate or substrates, thin (less than 1 mm) glass or even ultrathin glass (UTG).

One of the additional glass sheets can be tinted and the other clear or extra-clear. The thermoplastic lamination interlayer can be clear, extra-clear or tinted.

The device according to the invention can comprise a glazing, in particular a laminated and/or bent glazing, and the stack forms a strip, in particular a peripheral strip, over a portion of a main face of the glazing.

The device having a scattering which can be varied by liquid crystals as defined above can be used in a vehicle or building.

It can be used in particular as:
- internal partition (between two rooms or in a space) in a building, in a ground, rail, nautical or aerial vehicle (between two compartments, in a taxi, bus, train, and the like), in particular as glazed wall of shower or bath,
- glazed door (front or rear), window (single, double, triple glazing), ceiling, tiling (floor, ceiling), toilet door, a glazed portion of street or household furniture,
- glazing of an automobile vehicle (car, truck, bus, and the like), thus a ground, rail or nautical vehicle (boat): windshield, side window, roof, and the like,
- projection screen,
- shop window or display case, in particular of a counter.

Naturally, it can form all or part of a glazing (a partition and window of transom type and the like).

The device according to the invention can comprise a laminated and in particular bent glazing, and the stack of layers is between the first and second glazings, respectively "exterior" and "interior" glazings, and forms a peripheral strip over an upper portion of the glazing, the "external" edge face of the stack being masked from the outside by a first opaque peripheral layer, in particular an enamel, on the exterior glazing (preferably on face F2), and/or the "internal" edge face of the stack being masked from the inside by a second opaque peripheral layer, in particular an enamel, on the interior glazing (on face F4, for example, indeed even face F3).

For its incorporation in a laminated glazing, it is possible to use:
- three sheets (monolayer or multilayer PVB, EVA, PU, and the like), in particular two full sheets, with each in contact with one of the two glazings, and a central sheet with a store for housing the stack,
- two sheets (monolayer or multilayer PVB, EVA, PU, and the like), especially if the stack is fairly thin, in order for the two sheets to join by flow on either side of the stack.

It is possible, for the first and/or the second substrate or else for an additional glass sheet or a glazing of a laminated and/or multiple glazing, to choose a clear or extra-clear glass. A clear glass typically contains a content by weight of iron oxide of the order of 0.05 to 0.2%, whereas an extra-clear glass generally contains approximately 0.005 to 0.03% of iron oxide.

The additional glass sheet or a glazing of a laminated and/or multiple glazing can, however, be tinted, for example with blue, green, gray or bronze.

A tinted additional glass sheet or a tinted glazing of a laminated and/or multiple glazing can preferably exhibit a light transmission $T_L$ of greater than or equal to 10%—for example in a context where the environment on the side of the exterior face of the substrate (opposite the face with the electrode) is highly illuminated—, and preferably is greater than or equal to 40%.

The glass is preferably of soda-lime-silica type but it can also be a glass of borosilicate or alumino-borosilicate type. The thickness of the glass is generally within a range extending from 0.5 to 19 mm, preferably from 0.7 to 9 mm, in particular from 2 to 8 mm, indeed even from 4 to 6 mm.

The glass is preferably of the float glass type, that is to say capable of having been obtained by a process which consists in pouring the molten glass onto a bath of molten tin ("float" bath). In this case, the stack can be deposited both on the "tin" face and on the "atmosphere" face of the substrate. The terms "atmosphere" and "tin" faces are understood to mean the faces of the substrate which have respectively been in contact with the atmosphere prevailing in the float bath and in contact with the molten tin. The tin face contains a small superficial amount of tin which has diffused into the structure of the glass.

The thermoplastic lamination interlayer provides a bond with a rigid or flexible element. This polymer lamination interlayer can in particular be a layer based on polyvinyl butyral (PVB), on ethylene-vinyl acetate (EVA), on polyethylene (PE), on polyvinyl chloride (PVC), on thermoplastic urethane, on polyurethane PU, on ionomer, on adhesive based on polyolefin, on thermoplastic silicone or made of multi- or one-component resin which can be crosslinked thermally (epoxy, PU) or with ultraviolet radiation (epoxy, acrylic resin).

The PVB interlayer can be wedge-shaped, thus with a cross section which decreases in wedge shape from the top toward the bottom of the laminated glazing in order to avoid a double image in the case of a head-up display (HUD), very particularly for a windshield.

The PVB interlayer is optionally acoustic and/or tinted.

The acoustic PVB interlayer can comprise at least one "central" layer made of viscoelastic plastic with vibro-acoustic damping properties, in particular based on polyvinyl butyral (PVB) and plasticizer, and furthermore comprising two external layers made of standard PVB, the central layer being between the two external layers.

Optionally, one or both external layers has a cross section which decreases in wedge shape from the top toward the bottom of the laminated glazing, the layer made of viscoelastic plastic with vibro-acoustic damping properties having an unvarying cross section from the top toward the bottom of the laminated glazing. Mention may be made, as an example of an acoustic sheet, of the patent EP 0 844 075.

The first and/or second glazing of the laminated glazing can (depending on the esthetic result or the optical effect desired) be a clear glass (with a light transmission $T_L$ greater than or equal to 90% for a thickness of 4 mm), for example a glass of standard soda-lime composition, such as the Planilux® glass from Saint-Gobain Glass, or an extra-clear glass ($T_L$ greater than or equal to 91.5% for a thickness of 4 mm), for example a soda-lime-silica glass with less than 0.05% of Fe(III) or $Fe_2O_3$, such as the Diamant® glass from Saint-Gobain Glass or the Optiwhite® glass from Pilkington or the B270® glass from Schott, or a glass of another composition described in the document WO04/025334. It is also possible to choose the Planiclear® glass from Saint-Gobain Glass.

The glass of the first and/or second glazing can be neutral (without coloration) or (slightly) tinted, in particular gray or green, such as the TSA glass from Saint-Gobain Glass. The glass of the first and/or second glazing may have undergone a chemical or heat treatment of the hardening or annealing type or a tempering (in particular in order to obtain a better mechanical strength) or be semi tempered.

The light transmission $T_L$ can be measured according to the standard ISO 9050:2003 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The bent laminated glazing according to the invention, in particular windshield or side window, can have a $T_L$—in the clear glass area—which is preferably at least 70% and even at least 75% or even at least 80%.

The bent laminated glazing according to the invention, in particular sunroof, can have a light transmission $T_L$ of at most 10% and even of 1 to 6%.

For an automobile roof, one at least or all of the following criteria are preferred:
- an energy transmission $T_E$ of at most 10% and even of 4 to 6%,
- an energy reflection $R_E$ (preferably face F1 side) of at most 10%, better still of 4 to 5%,
- and a total transmission of the solar energy TST<30% and even <26%, even from 20 to 23%.

A table A below gives examples of glass sold by the applicant company. The SGS Thermocontrol® Absorbing/Venus glass improves the thermal comfort by absorbing the energy load in the body of the glass. These glasses are divided into two categories: "Vision" (light transmission>70%) and "Privacy" (light transmission<70%).

TABLE A

| Type of glass | $T_L$ (%) | $T_E$ (%) | $R_E$ (%) |
|---|---|---|---|
| SGS Thermocontrol ® Venus Green 55 | 49 | 27 | 7 |
| Green-tinted high-performance//Clear glass | 28 | 16 | 3 |
| SGS Thermocontrol ® Venus Green 35 | 35 | 22 | 5 |
| SGS Thermocontrol ® Venus Grey 10 | 10 | 8 | 1 |
| SGS Thermocontrol ® Absorbing TSA3+ | 71 | 44 | 18 |
| Standard green glass | 78 | 53 | 25 |

The "Vision" glass is suitable for all types of glazing in the vehicle: green/blue/gray, and provides a reduced energy transmission ($T_E$). The most popular color for this purpose is green. It has been chosen due to its neutral appearance, which does not affect the harmony of the colors of a vehicle.

The "Privacy" glass is a glazing which is bulk-tinted for thermal comfort and privacy. It is a glazing which is supertinted dark green or dark gray. In order to ensure privacy, this glazing exhibits light transmission values which are below 70%, generally around 55% or less. Due to its dark tint, this type of glass also provides a low UV transmission (UV rays can cause skin irritation).

In most countries, Venus/Privacy glass is suitable for the rear side windows (after the B-pillar), rear window and roof.

SGS Thermocontrol® Venus consists of supertinted glazing dark gray or dark green in color. They have all the thermal advantages of the glass of "Vision" type (SGS Thermocontrol® Type) with improved solar protection:
  lower energy transmission values (with respect to all the other glass solutions),
  its dark color also blocks UV radiation, which is responsible for skin irritation and discoloration of the passenger compartment,
  offers greater privacy for the vehicle's passengers (it is difficult to see through the glass from the outside).

Preferably, the bent laminated glazing forms a windshield of a road vehicle, such as an automobile or a truck.

The bending of the first and second glazings (in particular windshield) can be in one or more directions, as described for example in the document WO2010136702.

The area of the main face F1 (windshield or roof, in particular) can be greater than 1.5 m² and be, for example, less than 3 m².

In order to limit heating in the passenger compartment or to limit the use of air conditioning, one of the glazings at least (preferably the exterior glass) is tinted, and the laminated glazing can also comprise a layer which reflects or absorbs solar radiation, preferably on face F4 or on face F2 or F3, in particular a transparent electrically conductive oxide layer, a "TCO layer", (on face F4) or even a stack of thin layers comprising at least one TCO layer, or stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

A TCO layer (a layer of a transplant electrically conductive oxide) can be used for the first or second electrode or on face F4 as described. It is preferably a layer of mixed indium tin oxide (ITO) or a layer of fluorine-doped tin oxide ($SnO_2$:F).

Other layers are possible, including thin layers based on mixed indium zinc oxides (referred to as "IZOs"), based on gallium-doped or aluminum-doped zinc oxide, based on niobium-doped titanium oxide, based on cadmium or zinc stannate, or based on antimony-doped tin oxide. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5% and generally from 1 to 2%.

ITO is particularly preferred, especially with respect to $SnO_2$:F. Of higher electrical conductivity, its thickness can be smaller to obtain one and the same emissivity level. Easily deposited by a cathode sputtering process, in particular a magnetron cathode sputtering process, these layers are characterized by a lower roughness and thus a lower tendency to foul.

One of the advantages of fluorine-doped tin oxide is, on the other hand, its ease of deposition by chemical vapor deposition (CVD), which, contrary to the cathode sputtering process, does not require a subsequent heat treatment and can be implemented on the float flat glass production line.

The term "emissivity" is understood to mean the normal emissivity at 283 K within the meaning of the standard EN12898. The thickness of the low-emissivity (TCO, and the like) layer is adjusted, depending on the nature of the layer, so as to obtain the desired emissivity, which depends on the sought-for thermal performance qualities. The emissivity of the low-emissivity layer is, for example, less than or equal to 0.3, in particular less than or equal to 0.25 or even less than or equal to 0.2. For layers made of ITO, the thickness will generally be at least 40 nm, indeed even at least 50 nm and even at least 70 nm, and often at most 150 nm or at most 200 nm. For layers made of fluorine-doped tin oxide, the thickness will generally be at least 120 nm, indeed even at least 200 nm, and often at most 500 nm.

For example, the low-emissivity layer comprises the following sequence: high-index underlayer/low-index underlayer/a TCO layer/optional dielectric overlayer.

It is possible to choose, as a preferred example of low-emissivity layer (protected during a tempering), high-index underlayer (<40 nm)/low-index underlayer (<30 nm)/an ITO layer/high-index overlayer (5-15 nm)/low-index barrier overlayer (<90 nm)/final layer (<10 nm).

Mention may be made, as low-emissivity layer, of those described in the patent US2015/0146286, on the face F4, in particular in examples 1 to 3.

In particular, the face F4 of the laminated glazing is coated with a transparent functional layer, in particular a low-emissivity layer, preferably comprising a TCO layer, including a zone (supplied with electricity and thus an electrode) forming a touch button (for managing the first luminous surface).

Furthermore, use may be made in particular of all the liquid crystal systems known under the terms of "NCAP" (Nematic Curvilinearly Aligned Phases) or "PDLC" (Polymer Dispersed Liquid Crystal) or "CLC" (Cholesteric Liquid Crystal) or NPD-LCD (Non-homogenous Polymer Dispersed Liquid Crystal Display).

Use may be made of multistable liquid crystals and in particular of bistable smectic liquid crystals, for example as described in detail in the patent EP 2 256 545, which switch under the application of an alternating electric field in the pulsed form and which remain in the switched state until the application of a fresh pulse.

Use may also be made, for example, of gels based on cholesteric liquid crystals containing a small amount of crosslinked polymer, such as those described in the patent WO-92/19695. More broadly, the choice may thus be made of PSCT (Polymer Stabilized Cholesteric Texture) products.

Naturally, the liquid crystals can extend substantially over the whole surface of the first electrode or over (and least) one restricted region, optionally be over several regions.

$T_1$ is, for example, from 10 to 20 μm or less, especially if it is desired to mask only something which is distant. This can be more if the haze in the aligned state is less critical.

The lower the thickness $T_1$ is, the lower the commutation voltage is, and thus the more it is possible to be allowed to have one or more thick barrier films.

The thickness $T_1$ often results from a compromise between low haze in the aligned state and high haze in the disorganized state.

Preferably, $T_1+T_2+T_0=A$ where A is within a range from 7 or even 12 or 20 to 45 μm or even 40 μm or 35 μm.

Preferably, at least 150 V (amplitude of the voltage) is applied.

It is possible to provide electrical connections with the electrodes. For example, it is possible to use a first peripheral electrically conductive (metal, and the like) strip along the first electrode and a second peripheral electrically conductive strip along the second electrode. For example, the first electrically conductive strip is along the first lateral or longitudinal edge and a second electrically conductive strip is along a second opposite (lateral or longitudinal) and/or adjacent edge.

Conductive bands, in particular metallic conductive bands, for example made of copper, and for example with at most widths of 2 cm, are, for example, fixed at the periphery to the electrodes (one band per electrode, the bands preferably being on opposite edges) for the supplying of electricity.

It is possible to fix (weld, adhesive) electric cables to these electrically conductive bands.

The electroactive layer can be surrounded and in contact with a polymeric sealing adhesive seal, for example made of epoxy or preferably made of acrylate, for example as described in the document WO2012/028823. The material which will form the adhesive seal is, for example, applied as a cord in the nonpolymerized form, before or after the deposition of the electroactive layer having liquid crystals with the nonpolymerized matrix. Subsequently, a calendaring or, as an alternative, a pressing is carried out.

The polymerizations of the material for the seal and of the matrix are carried out subsequently.

Furthermore, the spacers can preferably be made of a transparent plastic material. The spacers determine (roughly) the thickness of the layer of liquid crystals. For example, spacers made of polymethyl methacrylate (PMMA) are preferred.

The spacers are preferably made of material with an optical index which is (substantially) equal to the optical index of (the polymeric matrix of) the layer of liquid crystals. The spacers are, for example, in the form of beads.

Preferably, the process for the manufacture of the electrically controllable device having a scattering which can be varied by liquid crystals as described above comprises, in order to form the first polymeric barrier layer, the use of the first transparent film (described above) and optionally, in order to form the second optional polymeric barrier layer, the use of the second transparent film (described above).

The first film can carry the first electrode, as already described. It is even possible to add a glass or plastic sheet, adhesively bonded by a layer of adhesive (optically clear adhesive, PSA adhesive described above), or a lamination interlayer (by autoclaving, and the like), described above, to the first electrode.

When a first substrate which carries the first electrode is used, it is possible to flatten the first electrode against the barrier film or to use the adhesion layer described above.

The layer of liquid crystals can be produced using a "dropwise filling" operation.

In order to form, in the laminated glazing, with said stack, it is possible to use:
three sheets (monolayer or multilayer PVB, EVA, PU, and the like), in particular two full sheets, with each in contact with one of the two glazings, and a central sheet with a store for housing the stack,
two sheets (monolayer or multilayer PVB, EVA, PU, and the like), especially if the stack is fairly thin, in order for the two sheets to join by flow on either side of the stack.

PVB is preferred in the world of vehicles.

Figure 2:
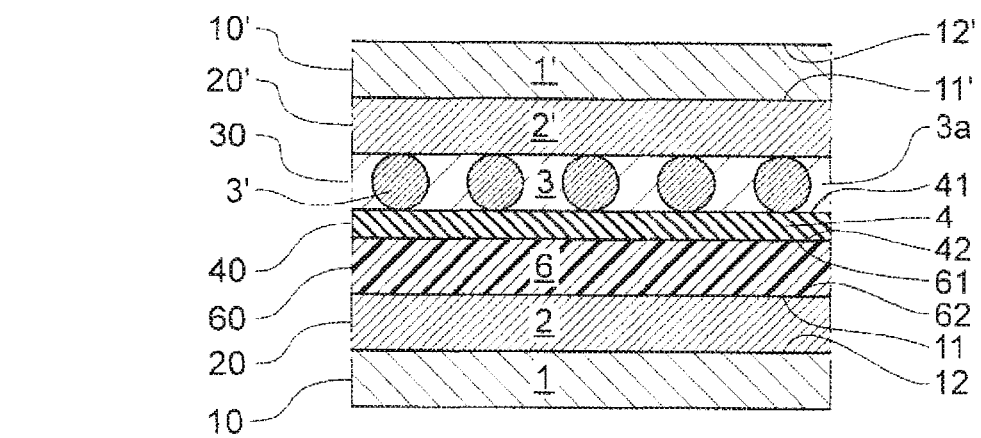
Figure 3:
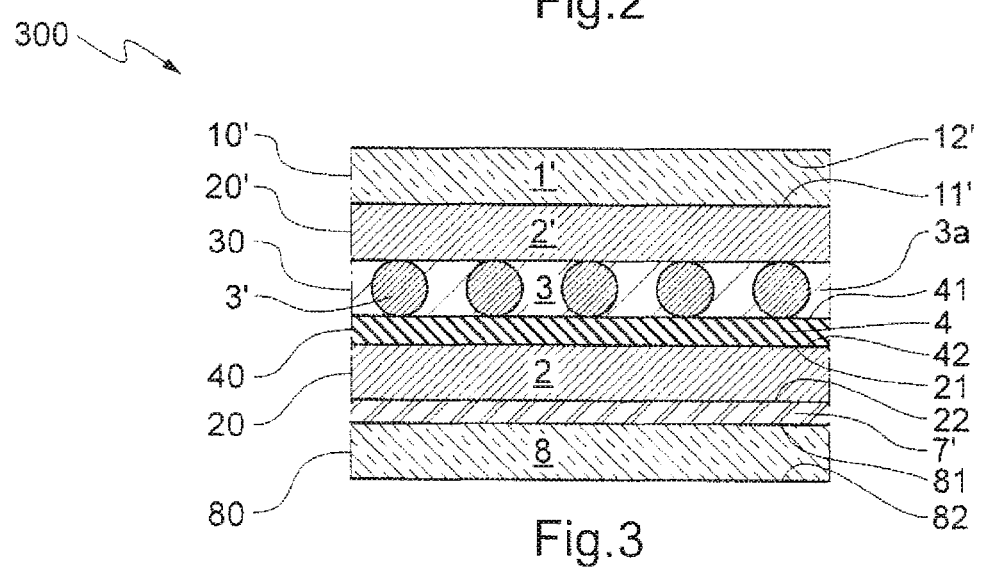
Figure 4:
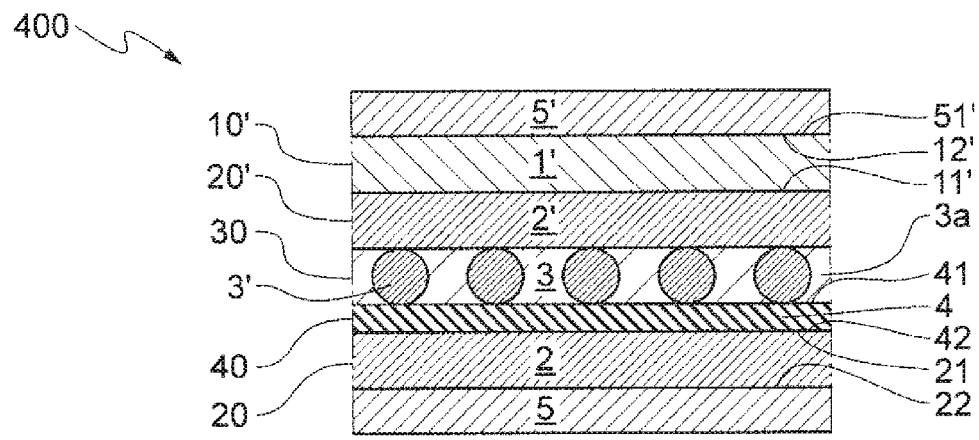
Figure 5:
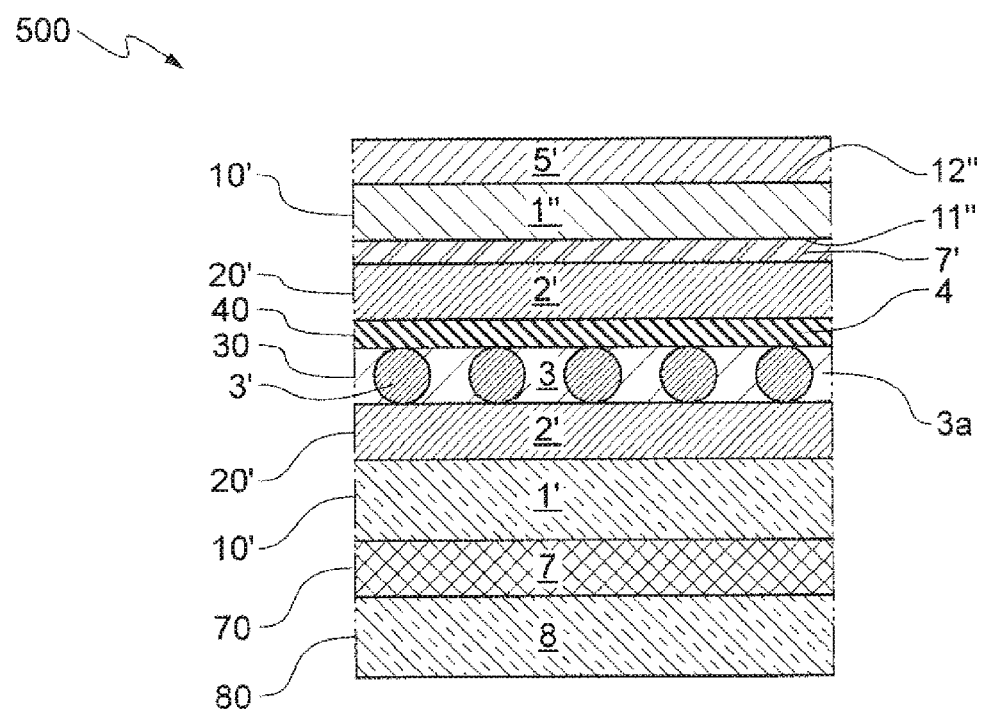
Figure 6:
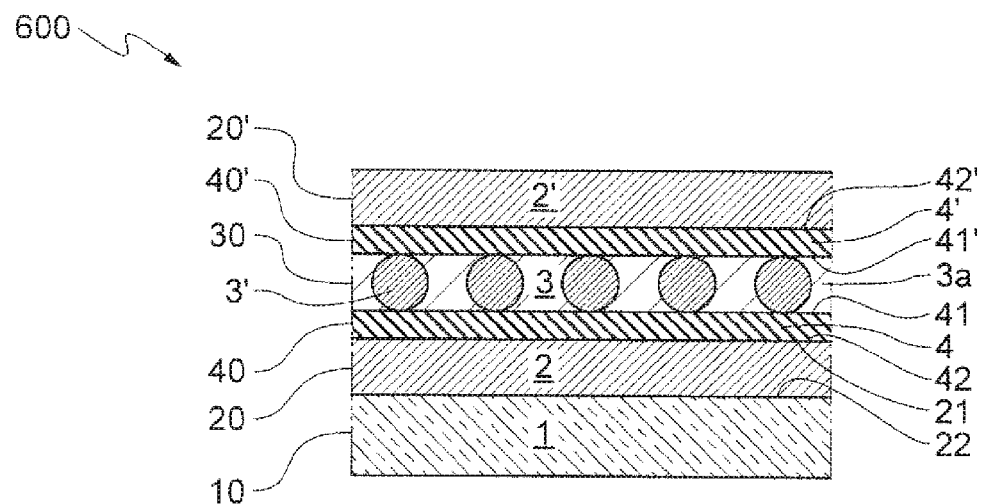
Figure 7:
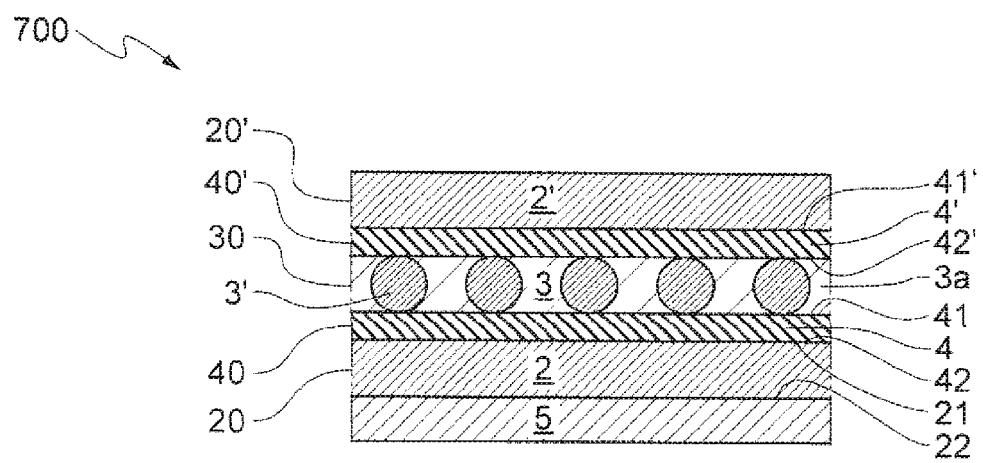
Figure 8:
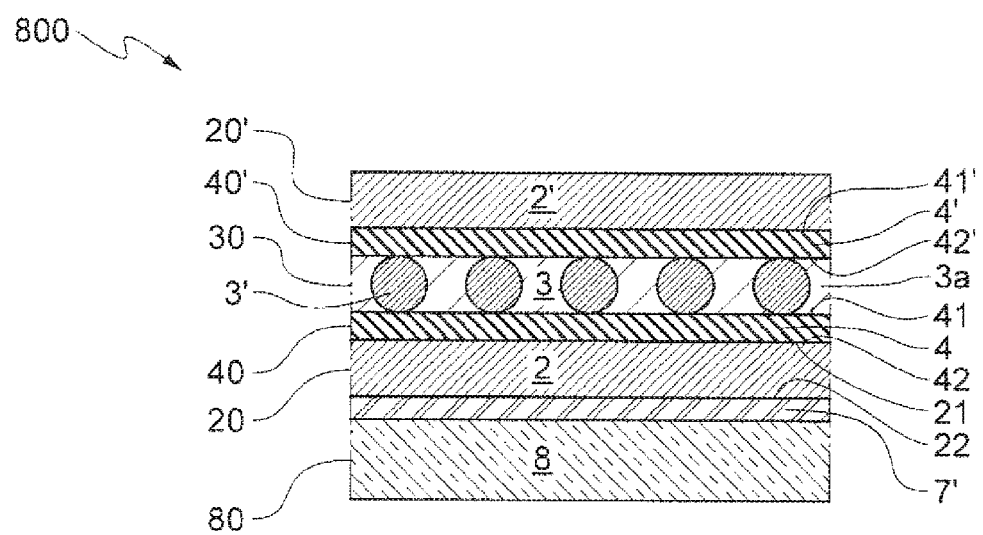
Figure 9:
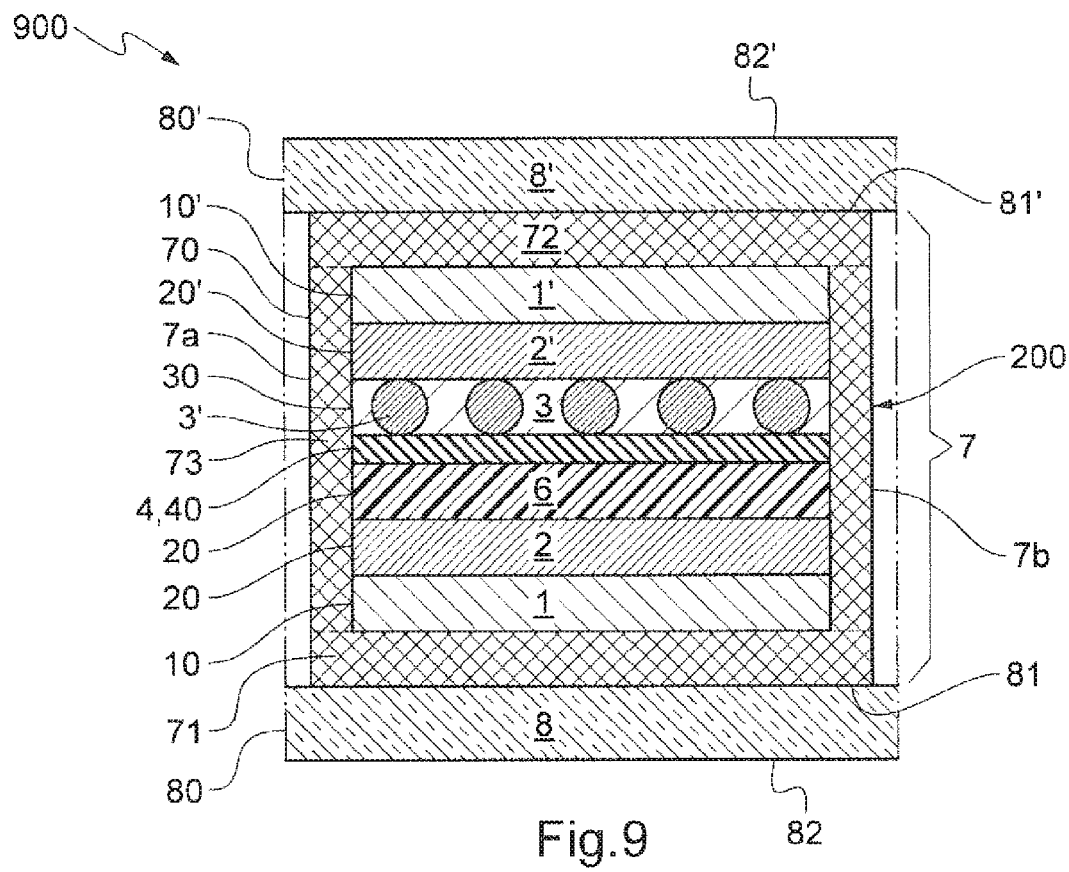
Figure 10:
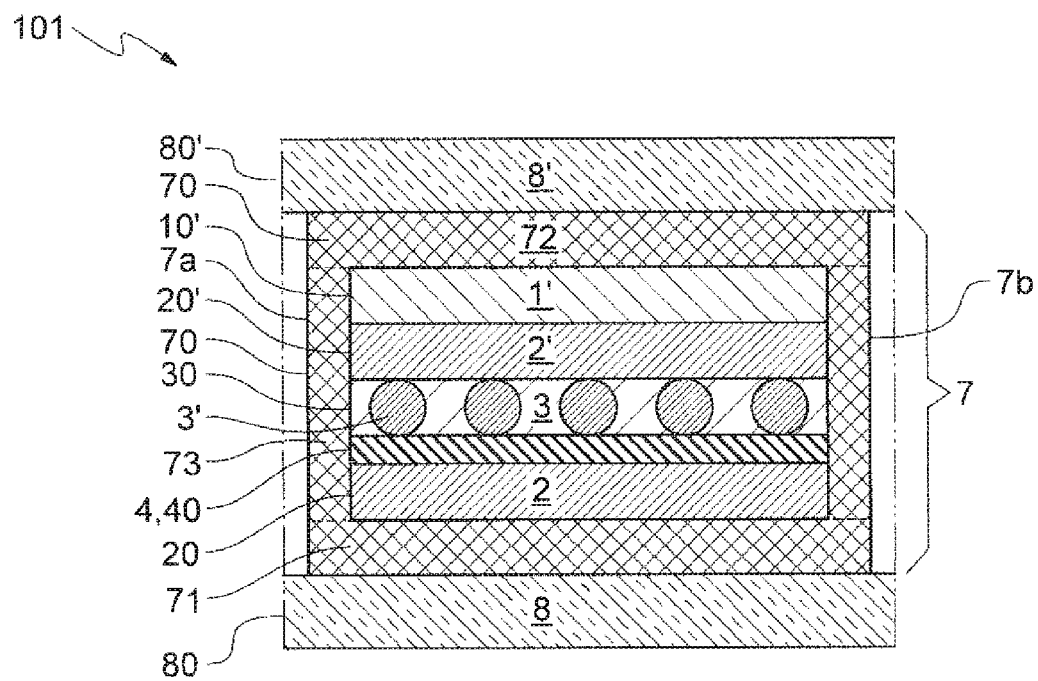
Figure 11:
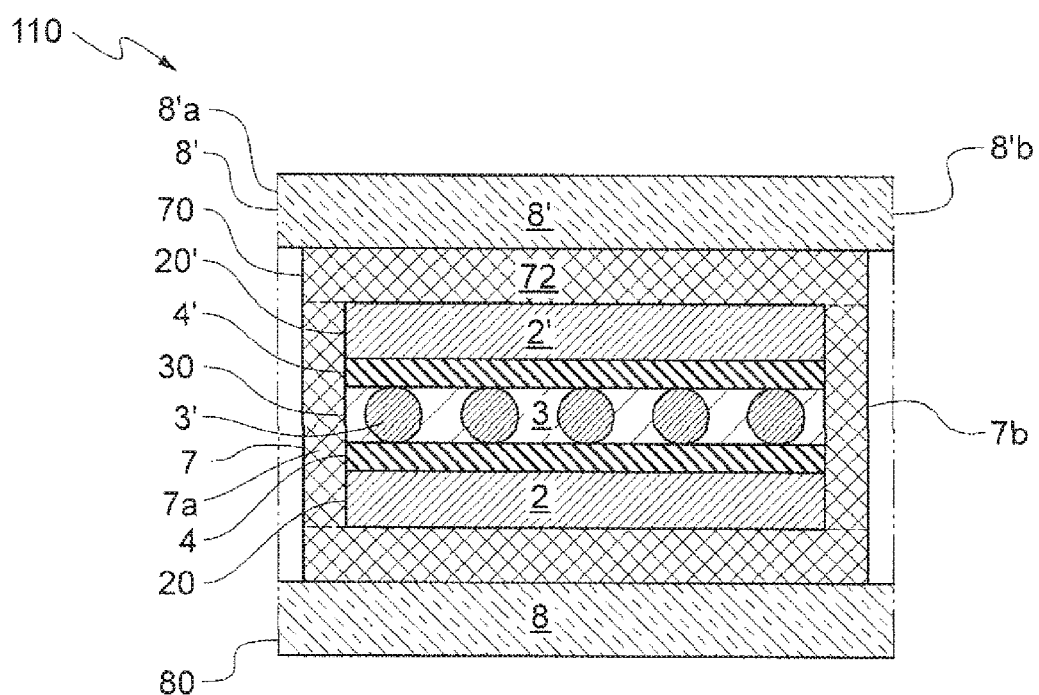
Figure 12:
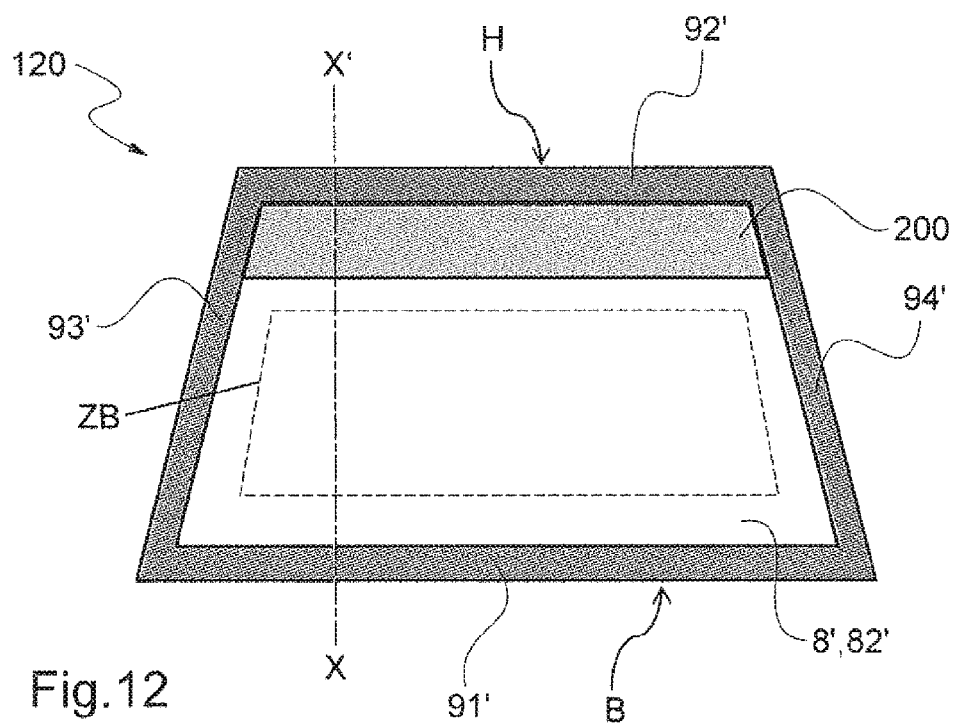
Figure 12:
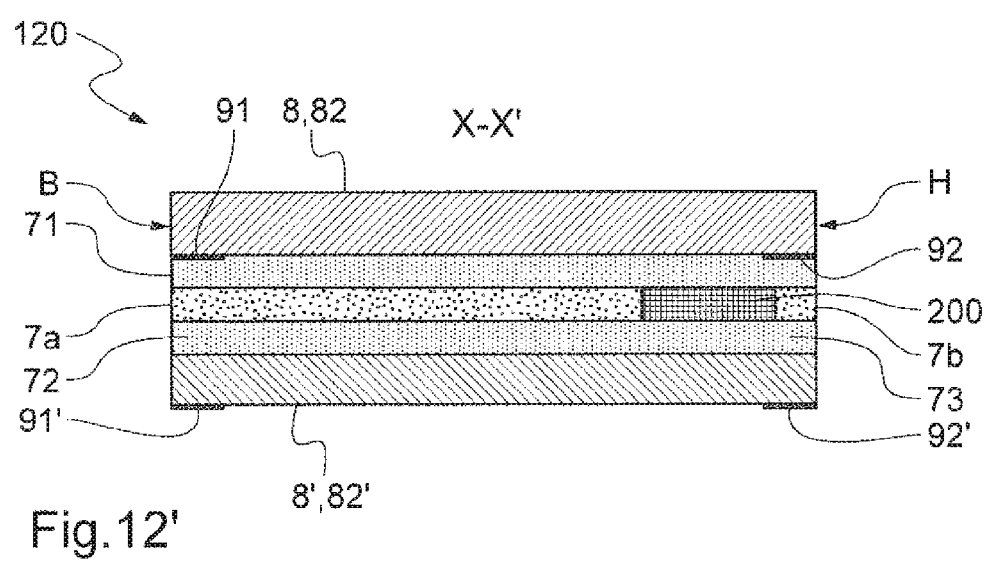

Other details and characteristics of the invention will become apparent from the detailed description which will follow, given with regard to the following appended drawings:

FIG. 1, representing a diagrammatic sectional view of a device having a scattering which can be varied by liquid crystals with polymeric barrier film in a first embodiment of the invention, FIG. 2, representing a diagrammatic sectional view of a device having a scattering which can be varied by liquid crystals with polymeric barrier film in a second embodiment of the invention, FIG. 3, representing a diagrammatic sectional view of a device having a scattering which can be varied by liquid crystals with polymeric barrier film in a third embodiment of the invention, FIG. 4, representing a diagrammatic sectional view of a device having a scattering which can be varied by liquid crystals with polymeric barrier film in a fourth embodiment of the invention, FIG. 5, representing a diagrammatic sectional view of a device having a scattering which can be varied by liquid crystals with polymeric barrier film in a fifth embodiment of the invention, FIG. 6, representing a diagrammatic sectional view of a device having a scattering which can be varied by liquid crystals with polymeric barrier film in a sixth embodiment of the invention, FIG. 7, representing a diagrammatic sectional view of a device having a scattering which can be varied by liquid crystals with polymeric barrier film in a seventh embodiment of the invention, FIG. 8, representing a diagrammatic sectional view of a device having a scattering which can be varied by liquid crystals with polymeric barrier film in an eighth embodiment of the invention, FIG. 9, representing a diagrammatic sectional view of a device having a scattering which can be varied by liquid crystals with polymeric barrier film in a ninth embodiment of the invention, FIG. 10, representing a diagrammatic sectional view of a device having a scattering which can be varied by liquid crystals with polymeric barrier film in a tenth embodiment of the invention, FIG. 11, representing a diagrammatic sectional view of a device having a scattering which can be varied by liquid crystals with polymeric barrier film in an eleventh embodiment of the invention, FIG. 12, representing a diagrammatic front view of a device having a scattering which can be varied by liquid crystals with polymeric barrier film in a twelfth embodiment of the invention, FIG. 12', representing a diagrammatic sectional view of the device having a scattering which can be varied by liquid crystals with polymeric barrier film of FIG. 12.

The elements in the figures are not represented to scale.

EXAMPLE 1

Exemplary embodiment No. 1 represented in FIG. 1 shows an electrically controllable device having a scattering which can be varied by liquid crystals according to the invention 100.

Electrodes 2,2' made of indium tin oxide (ITO) with a sheet resistance of 40 ohm/square, more broadly between 5 and 300 ohm/square, are deposited, on the main internal faces 11,11', on two plastic substrates, in particular polyester substrates, and better still such as of PET, 1 and 1' with a thickness of 50 to 300 µm, for example of 175 µm. And, for neutrality in colors, each electrode can also comprise at least two thin dielectric underlayers under the ITO layer.

In order to supply electricity, conductive bands (not shown), in particular metallic conductive bands, for example made of copper, are fixed, for example by adhesive bonding, along and on peripheral edges of the internal faces 11,11' and are in contact with the electrodes 2,2' (one band per electrode, the bands preferably being on opposite edges), These bands can protrude over at least one side of the edge face of the substrate 1,1' involved. These bands are subsequently connected to an electrical supply (not shown).

The PET substrates 1,1' can be of any shape, for example rectangular, round or square, and of any size, for example with a length of at least 1 m and even with a width of at least 10 cm (strip, and the like). They can have a thickness preferably of greater than 100 µm and of at most 300 µm for better mechanical strength of the assembly and/or for ease of processing or of handling but, if greater flexibility is desired, it is possible to go down, for example, to 50 µm.

A layer 3 of liquid crystals is located between the electrodes 2,2'. More specifically, the layer 3 of liquid crystals is, for example, of PDLC type and contains liquid crystals in the form of microdroplets dispersed in a matrix 3a made of polymer. The layer 3 also contains spherical spacers 3' made of transparent polymer. The thickness of the layer 3 is, for example, 15 µm and can vary from 5 to 45 µm typically.

Use may be made of liquid crystals such as the compound 4-((4-ethyl-2,6-difluorophenyl)ethynyl)-4'-propylbiphenyl and 2-fluoro-4,4'-bis(trans-4-propylcyclohexyl)biphenyl, for example sold by Merck under the reference MDA-00-3506.

In an alternative form which is less preferred, use is made of a layer of liquid crystals with spacers and without addition of polymer.

The edge faces 20,20' of the electrodes 2,2' and the edge 30 of the electroactive layer are preferably set back with respect to the edge 10,10' of the PET substrates 1,1'.

In order to prevent short-circuits, a plastic barrier film, preferably made of PET, 4, which is transparent, with a thickness of 12 µm or even 25 µm, is present on the first ITO electrode 2 (which is on the first PET substrate 1) and under the layer of liquid crystals 3. The barrier film 4 can cover the first electrode 2 (at least the active part) and its edge 40 can be set back from the edge 10,10' of the PET substrates 1,1', be in their alignment or even extend beyond, for example over just one side of the edge 10,10'. The absorption of this PET barrier film 4 is less than 0.1% and it has a haze of less than 1.5%. The PET barrier film 4 can be a monolayer or a multilayer. For example, it is a trilayer (by coextrusion), such as the product Lumirror U60 from Toray, the core of which, made of PET, between two coextruded external layers (also made of PET).

The PET barrier film 4 can have, on one or each main face, a conventional functional layer (adhesion promoter, and the like). One or each main face of the PET barrier film 4 may have undergone a chemical surface treatment, such as a grafting of molecular monolayers or an addition of surfactants.

Preference is given to a PET barrier film 4 of at least 10 µm, which is more readily available.

In the "OFF" state, that is to say before the application of an electric voltage, this glazing having liquid crystals 100 is scattering, that is to say that it transmits optically but is not transparent. As soon as a sinusoidal voltage is applied between the two electrodes, the layer 3 changes to the transparent state, that is to say the state in which the view is not impeded.

The addition of the barrier film 4 causes the voltage to increase very slightly to 120 V approximately.

By the application of a direct voltage of 100 V, the resistance of the device 100 is virtually infinite (10 gigaohms) versus ~1 kiloohm for a similar device without barrier film. This demonstrates the absence of short-circuits by virtue of the invention.

The layer of liquid crystals 3 is preferably set back with respect to the edge of first PET substrates 1, 1' and also set back from the edge of the barrier film 4. Better still, the layer of liquid crystals 3 can be surrounded by an adhesive seal (not shown) made of crosslinked polymer which, on the main face 42 and the ITO layer 2' (or directly the internal face 12' of the second PET substrate 1'), serves at the same time to connect, in a closed and permanent manner, the second PET substrate 1' and the barrier film 4.

The PET barrier film 4 can extend beyond the edge of the PET substrates 1,1' over one side, two sides, three sides or the four sides.

The PET barrier film 4 can facilitate the electrical connection of the first electrode.

The exterior face 12 of the first PET 1' comprises a hard coat, for example formed by application of an acrylate-based mixture, such as the product SR344 and the product SR399 from Sartomer Company.

The exterior face 12' of the first PET 1' comprises a temporary protective film which, after removal, leaves visible and ready-for-use a layer of adhesive 5a covering the face 12' or forming a peripheral frame for fixing the stack to a portion or all of the surface of a transparent support (plastic sheet, single or laminated glazing on an internal or external surface of a glazing of a double or triple glazing, and the like).

In an alternative to the self-supporting PET (or more broadly polyester) barrier film, a PP film, for example a multilayer PP film, is chosen.

In an alternative to the self-supporting barrier film, a deposit by the liquid route, which has to have a thickness of at least 1 µm, is chosen as polymeric barrier layer.

The advantage of a self-sporting film is its uniformity in thickness, the ease of tailor-making and its availability on a large scale at low cost.

In an alternative, the PET barrier film is tinted and/or the first and/or second carrier substrate (plastic or other) is tinted.

In an alternative to the choice of ITO, alone or in a multilayer, a silver-containing stack is chosen for one or both electrodes. It is even possible to choose, for one of the electrodes, a layer with a lower $T_L$ or even a reflecting layer.

One or the external faces of the first and second carrier substrates 1,1' can comprise one or more functional layers (antireflective, and the like) already known.

One of the first and second carrier substrates 1,1', and even the associated electrode, can be greater in size than the remainder of the stack. For example, the electrically conductive layer, such as ITO (or other), can act as solar control layer or else as heating layer. The ITO region acting as electrode can then be isolated by laser etching, for example, in order to form an ITO strip.

One and/or other of the first and second carrier substrates 1,1' can be replaced by a glass sheet, for example of 0.7 mm to 4 mm, with or without a layer on its external face, or else by a plastic sheet—with or without a layer on its external face—for example thicker (such as from 1 to 10 mm), a polycarbonate or else a PMMA.

The manufacturing process of example No. 1 is described more precisely below.

The following mixture is prepared in order to form the layer of liquid crystals:
- 0.45 g of photoinitiator A (MXM035-A, sold by Nematel),
- 3.8 g of monomer B (MXM035-B, sold by Nematel),
- 5.75 g of liquid crystals (MDA-00-3506, for example from Merck),
- 0.03 g of polymeric spacers with a diameter of 15 µm (SP-215 from Sekisui).

Other examples of compositions, based on acrylate and on mercaptan, are described in the application U.S. Pat. No. 4,891,152.

This mixture is deposited dropwise on the second PET substrate 1' with the second ITO electrode 2' (and preferably its already adhesively-bonded conductive strip) without extending as far as the edge face of the film, preferably. Preferably, a peripheral sealing seal is formed in an edge region with the ITO or even in a marginal region without ITO close to the edge face of the PET 1'. The seal can be interrupted by one or more vents. In order to form the seal, a "preseal" material containing precursors of the crosslinked polymer forming the seal, is likewise applied directly along the edge of the PET substrate after (indeed even before) the deposition of the composition of the layer having PDLC liquid crystals. The preseal forms a cord which is or will be in contact with the composition of the layer of PDLC liquid crystals. More specifically, the seal adhesive material contains, for example, a mixture of isobornyl acrylate, of 2-hydroxyethyl methacrylate phosphate and of acrylate oligomers, for example forming at least 10% by weight of the preseal, indeed even at least 30% by weight of the preseal, and which also contains a filler (mineral powder) and a photoinitiator for its polymerization and crosslinking with ultraviolet radiation.

The barrier film 4 is affixed to the optional sealing seal and to the mixture using a roll, thus forming a continuous layer without extending as far as the edge face of the film, preferably.

The UV treatment for the polymerization is carried out for 100 s (UV source), thus forming the polymeric layer with liquid crystals and also the optional seal.

The first PET substrate 1 with the first ITO electrode 2 (and preferably its already adhesively-bonded conductive strip) is superimposed on the barrier film 4, preferably after the UV treatment.

Alternatively to the application of the barrier film by a roll, a calendaring (or, in an alternative form, a pressing) is carried out.

The preseal, having vents, and the layer of PDLC liquid crystals are compressed down to the thickness of the spacers. The vents are thus used to discharge the air as calendaring is carried out and/or to discharge the possible excess of layer of liquid crystals.

The application of an additional material, forming a bridge between the ends of the seal, preferably based on acrylate polymer precursor and devoid of epoxy precursor and for example made of said seal material, thus forming material continuity, is subsequently provided for.

The operation of polymerization of the matrix and of crosslinking of the adhesive seal and of the additional material is subsequently carried out by irradiation with UV light.

It should be noted that the ITO layers 2,2' are preferably deposited by magnetron cathode sputtering. The ITO layers 2,2' are deposited, for example, using a ceramic target in an argon/oxygen atmosphere in an alternative form.

EXAMPLE 2

Exemplary embodiment No. 2 represented in FIG. 2 shows an electrically controllable device having a scattering which can be varied by liquid crystals according to the invention 200.

The device 200 differs from the preceding one in that it comprises, between the barrier film 4 (PET, and the like) and the first electrode 2 (ITO, and the like), a layer for promoting contact, "adhesion layer", 6 made of conducting polymer, such as PEDOT/PSS, or, in an alternative form, a dielectric layer made of hydrogel, with a main internal face 61 on the side of the electroactive layer 3 and a main external face 62 on the side opposite the electroactive layer.

During manufacture, the barrier film 4 with the first electrode 2 can be preassembled with the adhesion layer 6 and the first substrate with the ITO 2 and then the assembly can be applied against the electroactive layer based on liquid crystals 3.

In an alternative, the adhesion layer is deposited on the barrier film 4 already applied against the layer based on liquid crystals 3.

In an alternative, the adhesion layer is deposited on the first electrode 2 and against the barrier film 4 already applied against the layer based on liquid crystals 3.

EXAMPLE 3

Exemplary embodiment No. 3 represented in FIG. 3 shows an electrically controllable device having a scattering which can be varied by liquid crystals according to the invention 300.

The device 300 differs from the first device 100 in that:

the barrier film 4 carries the first electrode layer 2, with the result that the first substrate is eliminated, optionally, the second substrate 1' is chosen to be made of glass (which can be an ultrathin glass UTG, a thin glass or glass of standard thickness), for better strength, an additional glass sheet 8, for example made of clear or extra-clear glass and of at least 1 mm, which can be equal to or greater than the remainder of the stack in size, is adhesively bonded via an optically clear adhesive 7' (of any thickness) based on polyester or acrylic or on silicone for example, starting from the Dow Adcote compositions mixing the product 76R44 (modified polyester) with the product (coreactant) 9L10, or else the PSAs from Oribain (BPS family, and the like).

Neither is it necessary to retain a hard coat or a sheet of liner type.

During manufacture, the carrier barrier film 4 of the first electrode 2 can be preassembled by adhesive bonding with the glass sheet and then applied against the electroactive layer 3 based on liquid crystals.

In an alternative, the layer of adhesive 7' is either deposited on the first electrode 2 and the glass 8 is assembled or on the glass 8 and the adhesive-treated glass is assembled.

EXAMPLE 4

Exemplary embodiment No. 4 represented in FIG. 4 shows an electrically controllable device having a scattering which can be varied by liquid crystals according to the invention 400.

The device 400 differs from the first device 100 in that:

the barrier film 4 carries the first electrode 2, with the result that the first substrate is eliminated, and also the hard coat, the first electrode 2 is optionally coated with a temporary protective adhesive film 5, in particular with a layer of adhesive, such as already described (OCA, pressure-sensitive, and the like) on the side of the first electrode 2, in order to fix the stack to a portion or the whole of the surface of a transparent support (glazing, plastic sheet, and the like), the second carrier substrate 1' comprises a hard coat as already described, rather than a temporary adhesive film.

Alternatively, the temporary adhesive film is maintained on the side of the second carrier substrate 1' while optionally retaining that on the first electrode side, for example if the stack is between two transparent supports (glazing, plastic sheet, and the like) over a portion or the whole of their surfaces.

EXAMPLE 5

Exemplary embodiment No. 5 represented in FIG. 5 shows an electrically controllable device having a scattering which can be varied by liquid crystals according to the invention 500.

The device 500 differs from the first device 100 in that:

the barrier film 4 carries the first electrode layer 2, with the result that the first substrate is eliminated, a first plastic film, such as PET 1", in particular with a thickness of 50 to 300 µm, is adhesively bonded by its internal face 11" via an optically clear adhesive 7' (such as already described) to the first electrode 2, it being possible for its external face 12" to have a hard coat 5', the first electrode 2 is optionally coated with a temporary protective adhesive film 5, in particular with a layer of adhesive, such as already described (OCA, pressure-sensitive, and the like) on the side of the first electrode 2, in order to fix the stack to a portion or the whole of the surface of a transparent support (plastic sheet, glazing, and the like), the second substrate 1' is a glass sheet, the external face 12' of which is laminated via a thermoplastic lamination interlayer 7, for example PVB or EVA or PU, with another glass sheet, indeed even plastic sheet (rigid, for example), 8.

The edge 70 of this interlayer can be set back from the edge 80 of the other sheet 8.

The complete device 500 can act as partition.

Preferably, the lamination occurs after the UV polymerization and before the application of the external plastic film 1".

The laminated glazing and also the associated electrode 2' can have greater sizes than the remainder of the stack. For example, the electrode layer (ITO or other) can act as solar control layer or else as heating layer. The region acting as electrode can then be isolated by laser etching, for example, in order to form a strip.

EXAMPLE 6

Exemplary embodiment No. 6 represented in FIG. 6 shows an electrically controllable device having a scattering which can be varied by liquid crystals according to the invention 600.

The device 600 differs from the first device 100 in that:

the first substrate 1 carrying the first electrode 2 is a glass sheet, with a free external face (or with an antireflective layer, and the like), and, in an alternative form, the external face 12 is laminated via a thermoplastic lamination interlayer, for example PVB or EVA or PU, with another glass sheet, indeed even a plastic (rigid, and the like), a second polymeric barrier film, preferably of the same material (and sizes) as the first (PET), 4', with a thickness $T_2$, for example of 12 µm, is between the electroactive layer 3 and the second electrode and even in this instance the second barrier film 4' carries the second electrode layer 2', with the result that the second substrate is eliminated.

The main external face 42' of the second barrier film is in contact with the second electrode 2' and its main internal face 41' is in contact with the electroactive layer 3. The edge 40' of the second barrier film can be aligned with that 40 of the first film 4 or the edge of the first substrate 1.

It is possible to choose to reduce the thickness $T_1$ (and to lower $T_2$) by the addition of a second barrier film 7'. For example, $T_1$ and $T_2$ (which are not necessarily equal) are chosen between 2 and 10 µm. Like for the first film, the second can be tinted depending on the demands.

The first carrier substrate, in this instance glazing 1, and also the associated first electrode 2 can have greater sizes than the remainder of the stack. For example, the ITO (or other) layer can act as solar control layer or else as heating layer. The ITO region acting as electrode can then be isolated by laser etching, for example, in order to form an ITO strip.

EXAMPLE 7

Exemplary embodiment No. 7 represented in FIG. 7 shows an electrically controllable device having a scattering which can be varied by liquid crystals according to the invention 700.

The device 700 differs from the first device 100 in that:
the first barrier film 4' carries the first electrode layer 2', with the result that the second substrate is eliminated, a temporary protective adhesive film 5 optionally being added,
a second polymeric barrier film, preferably of the same material as the first (PET), 4', with a thickness $T_2$, for example of 12 µm, is between the electroactive layer 3 and the second electrode 2' and even in this instance the second barrier film 4' carries the second electrode layer 2', with the result that the second substrate is eliminated.

It is possible to choose to reduce the thickness $T_1$ (and to thicken $T_2$) by the addition of a second barrier film. For example, $T_1$ and $T_2$ (which are not necessarily equal) are chosen between 2 and 10 µm. Like for the first film, the second can be tinted depending on the demands.

The device 700 can be flexible, can fit the curvatures of a support of the same size or of greater size (on the preferably external face of the shower wall, on the preferably internal face (face "F4") of a bent vehicle glazing, in particular bent automobile glazing: roof, side window, windshield).

EXAMPLE 8

Exemplary embodiment No. 8 represented in FIG. 8 shows an electrically controllable device having a scattering which can be varied by liquid crystals according to the invention 800.

The device 800 differs from the preceding device 700 in that the first electrode 2 is adhesively bonded, via an optically clear adhesive 7', to a glass sheet 8 (flat, bent, tempered, and the like).

The glass sheet 8 can be greater in size than the remainder of the stack.

EXAMPLE 9

Exemplary embodiment No. 9 represented in FIG. 9 shows an electrically controllable device having a scattering which can be varied by liquid crystals according to the invention 900.

The device 900 comprises the second device 200 which is in a laminated glazing, that is to say in a lamination interlayer 7, for example PVB or EVA, which is submillimetric or of at most 2 mm, between a first and a second glazing 8,8', for example of rectangular (or more broadly quadrilateral, polygonal) general shape, with identical or similar dimensions, for example with a thickness of at most 5 mm or 3 mm, with main internal faces 81,81' on the interlayer side and main external faces 82,82'.

During manufacture, it is possible to use three interlayer sheets: two full sheets 71,72 against the internal faces 81,81' of the glazings 8,8' and a central sheet 73 with an opening for housing the stack 200. After lamination, the interface between sheets (symbolized in dotted lines) is not necessarily discernible. It is preferable for the opening to be closed rather than completely emerging on one side. Thus, the entire edge of the stack is surrounded with lamination interlayer 7. Naturally, for the electrical supply, connections can exit from the device 200 and even protrude over one or more sides of the edges of the glazings. Alternatively, it is possible to use two interlayer sheets 71,72, the central hollowed-out sheet not being necessary if the stack is sufficiently thin, for example with a thickness of at most 0.2 mm.

The first glazing 8 or 8' can be tinted (gray, green, bronze, and the like) and the other glazing 8' or 8 clear or extra-clear. A first interlayer sheet can be tinted (gray, green, bronze, and the like) and the other(s) clear or extra-clear. One of the first glazings 8 or 8' can be replaced by a plastic sheet, such as a polycarbonate or a PMMA (in particular with a lamination interlayer made of PU).

The edge 70 of the lamination interlayer can be set back (by at most 5 mm, for example) from the edge 80,80' of the glazings 8,8'.

The device 200 covers virtually the whole of the main faces 81 to 82' and even in this instance is centered. There is the same width of PVB 7a,7b on either side of the device 200.

The glazings 8,8' are flat or bent, it being possible for the device 200 to fit the curvature(s) of the glazings.

The device 900 can be a partition or else a vehicle roof. For example, for an automobile roof:
the glazing 8 is the bent exterior glazing, which is a tinted glazing of 3 mm,
the glazing 8' is the bent interior glazing, which is a clear glazing of 3 mm or thinner,
the lamination interlayer 8 is made of PVB, which can be acoustic, in particular bilayer or trilayer (sheet 71 or 72).

EXAMPLE 10

Exemplary embodiment No. 10 represented in FIG. 10 shows an electrically controllable device having a scattering which can be varied by liquid crystals according to the invention 101.

The device 101 differs from the preceding device 900 in that the barrier film 4 carries the first electrode (ITO, and the like) 2; the main external face of the latter is thus in contact with the lamination interlayer (the first substrate being eliminated).

During manufacture, it is possible to use three interlayer sheets: two full sheets 71,72 against the internal faces 81,81' of the glazings 8,8' and a central sheet 73 with an opening for housing the stack. Alternatively, it is possible to use two interlayer sheets 71,72, the central hollowed-out sheet not being necessary if the stack is sufficiently thin, for example with a thickness of at most 0.2 mm.

After lamination, the interface between sheets (symbolized in dotted lines) is not necessarily discernible.

EXAMPLE 11

Exemplary embodiment No. 11 represented in FIG. 11 shows an electrically controllable device having a scattering which can be varied by liquid crystals according to the invention 101.

The device 110 differs from the preceding device 101 in that it comprises a second barrier film 4' carries the second electrode (ITO, and the like) 2'; the main external face of the latter is thus in contact with the lamination interlayer (the second substrate being eliminated).

During manufacture, it is possible to use three interlayer sheets: two full sheets 71,72 against the internal faces 81,81' of the glazings 8,8' and a central sheet 73 with an opening for housing the stack. Alternatively, it is possible to use two interlayer sheets 71,72, the central hollowed-out sheet not being necessary if the stack is sufficiently thin, for example with a thickness of at most 0.2 mm.

After lamination, the interface between sheets (symbolized in dotted lines) is not necessarily discernible.

EXAMPLE 12

Exemplary embodiment No. 12 represented in FIGS. 12 and 12' shows an electrically controllable device having a scattering which can be varied by liquid crystals according to the invention 120.

The device 120 differs from the ninth device 900 in that the stack 200 covers a surface portion, in particular a peripheral strip, for example along an upper longitudinal edge H of an automobile vehicle windshield (bent laminated glazing with the device 200), over virtually the whole length of the windshield.

This strip 200 is in a marginal region in which the criteria of $T_L$ and of absence of haze are looser than in the central region ZB.

As shown in FIG. 12' (sectional view), the width 7a of central interlayer 73 between the device 200 and the lower longitudinal edge B is greater than the width 7b of central interlayer 73 between the device 200 and the upper longitudinal edge H.

In an alternative form or simultaneously, it can be present along a lower longitudinal edge B of the windshield, over the entire length or a portion of length.

As shown in FIG. 12 (front view, interior side of the vehicle), the windshield comprises a first opaque frame, for example made of enamel (black or other), 91' to 94' over the lateral and longitudinal edges of the free face (F4) 82' of the internal glazing 8' and a second opaque frame, for example made of enamel (black or other), 91 to 94 over the lateral and longitudinal edges of the free face (F1) 82 of the external glazing 8.

The edge face of the device 200, which is on the side of the lower longitudinal edge, and even those on the sides of the lateral edges, can be between the layers 92, 92', 93, 93', 94, 94' of the enamel frames. For example, the connections and other strips for conveying current can also be masked by these layers 92, 92', 93, 93', 94, 94'.

The invention claimed is:

1. An electrically controllable device having a scattering which is variable by liquid crystals, comprising:
    a first transparent substrate;
    a second transparent substrate, and
    a stack of layers arranged between the first and the second transparent substrates, the stack of layer comprising in this order
        a first electrode comprising a first electrically conductive layer,
        an electroactive layer containing liquid crystals and a plurality of spacers, alternating reversibly between a scattering state and a transparent state, by application of an alternating electric field, the electroactive layer having a micronic thickness $T_0$, the plurality of spacers arranged within the electroactive layer and spaced apart from one another to define the micronic thickness of the electroactive layer,
        a second electrode comprising a second electrically conductive layer, the electroactive layer being visible by transparency on a side of the first electrode or on a side of the second electrode, or both,
    wherein the stack comprises, between the first electrode and the electroactive layer, a first transparent polymeric barrier layer with a thickness of $T_1$ and optionally, between the second electrode and the electroactive layer, a second transparent polymeric barrier layer with a thickness of $T_2$, wherein the thickness $T_1$ of the first transparent polymeric barrier layer is at least 7 μm, and $T_1+T_2$ being at most 40 μm,
    wherein the first transparent polymeric barrier layer carries the first electrode on a first main exterior face oriented on a side opposite the electroactive layer or the first electrode is on a first main internal face of a first dielectric substrate oriented toward the electroactive layer,
    and wherein the second optional polymeric barrier layer carries the second electrode on a second main exterior face oriented on the side opposite the electroactive layer or the second electrode is on a second main internal face of a second dielectric substrate oriented toward the electroactive layer.

2. The electrically controllable device having a scattering which can be varied by liquid crystals as claimed in claim 1, wherein the first polymeric barrier layer is a first transparent film based on polymeric material chosen from a polyester, a polycarbonate, a polyolefin, a polyurethane, a polyamide, a polyimide or a fluoropolymer.

3. The electrically controllable device having a scattering which can be varied by liquid crystals as claimed in claim 1, wherein the first transparent polymeric barrier layer is a transparent film with a thickness $T_1$ of at most 25 μm and the second polymeric layer is absent.

4. The electrically controllable device having a scattering which can be varied by liquid crystals as claimed in claim 1, wherein the first transparent polymeric barrier layer is a transparent film with a thickness $T_1$ of at most 20 μm and the second polymeric layer is a transparent film with a thickness $T_2$ of at most 20 μm.

5. The electrically controllable device having a scattering which can be varied by liquid crystals as claimed in claim 1, wherein the first dielectric substrate is transparent and carries the first electrode and the first polymeric barrier layer chosen from the following polymers: polyacrylate, polyester, polyurethane, polyamide, polyethylene, polyalcohol, polyvinylpyrrolidone, polycarbonate, polystyrene, cellulose polymer or synthetic latex.

6. The electrically controllable device having a scattering which can be varied by liquid crystals as claimed in claim 1, wherein the first dielectric substrate is transparent and carries the first electrode which is transparent and is chosen from a first glass sheet or a first transparent polymeric sheet with on the side of the first external face opposite the first internal face an optional hard coat.

7. The electrically controllable device having a scattering which can be varied by liquid crystals as claimed in claim 6, wherein the first electrode is mineral and the device comprises, between the first electrode and the first transparent polymeric barrier film, a transparent and polymeric adhesion layer which is electrically conductive or which is dielectric and with a thickness $T_3$ of at most 10 μm.

8. The electrically controllable device having a scattering which can be varied by liquid crystals as claimed in claim 1, wherein the first dielectric substrate is a first glass sheet which is, on the side of the first external face opposite the first internal face, laminated via a thermoplastic lamination interlayer with another glass sheet.

9. The electrically controllable device having a scattering which can be varied by liquid crystals as claimed in claim 1, wherein the first polymeric barrier layer is a first film carrying the first electrode and optionally the second polymeric barrier layer is a second film carrying the second electrode.

10. The electrically controllable device having a scattering which can be varied by liquid crystals as claimed in claim 9, further comprising a first additional transparent sheet, polymeric or made of glass, bonded to the first electrode by a first transparent dielectric adhesive layer or by a thermoplastic lamination interlayer.

11. The electrically controllable device having a scattering which can be varied by liquid crystals as claimed in claim 1, wherein the first polymeric barrier layer is tinted.

12. The electrically controllable device having a scattering which can be varied by liquid crystals as claimed in claim 1, further comprising a laminated glazing comprising:
 a first glass sheet formed by said first transparent substrate,
 a thermoplastic lamination interlayer,
 a second additional glass sheet or a plastic sheet formed by said second transparent substrate,
 wherein main internal faces of the first and second additional glass sheets face one another, the stack being between the main internal faces.

13. The electrically controllable device having a scattering which can be varied by liquid crystals as claimed in claim 1, further comprising a glazing including said first and second transparent substrates and wherein the stack forms a strip over a portion of a main face of said glazing.

14. The electrically controllable device having a scattering which can be varied by liquid crystals as claimed in claim 1, further comprising a laminated glazing including said first and second transparent substrates, and wherein the stack forms a peripheral strip over an upper portion of the laminated glazing, an external edge face of the stack being masked from the outside by a first opaque peripheral layer on an exterior glazing formed by one of the first and second transparent substrates, or an internal edge face of the stack being masked from the inside by a second opaque peripheral layer on the interior glazing formed by the other one of the first and second transparent substrates.

15. The electrically controllable device having a scattering which can be varied by liquid crystals as claimed in claim 13, wherein the glazing is laminated and is bent and is chosen from a glazing of an automobile or rail or nautical vehicle.

16. The electrically controllable device having a scattering which can be varied by liquid crystals as claimed in claim 13, wherein the glazing is a glazed door, a shop window or display case, a partition, a glazed portion of street or household furniture and/or forms part of a double or triple glazing.

17. The electrically controllable device having a scattering which can be varied by liquid crystals as claimed in claim 2, wherein the polymeric material is a polyethylene terephthalate or a polyethylene naphthalate.

18. The electrically controllable device having a scattering which can be varied by liquid crystals as claimed in claim 9, wherein the first polymeric barrier layer is a first transparent film and the second polymeric barrier layer is a second transparent film.

19. The electrically controllable device having a scattering which can be varied by liquid crystals as claimed in claim 10, wherein the first transparent dielectric adhesive layer is an optically clear adhesive.

20. The electrically controllable device having a scattering which can be varied by liquid crystals as claimed in claim 13, wherein the glazing is a laminated or bent glazing, or both.

* * * * *